US012710387B2

(12) United States Patent
Sperle et al.

(10) Patent No.: US 12,710,387 B2
(45) Date of Patent: Aug. 18, 2026

(54) APPARATUS, SYSTEM AND METHOD FOR MONITORING EXTERNAL PROPERTIES OF PLANT EQUIPMENT AND/OR PIPE WORK

(71) Applicant: Indusenz AS, Trondheim (NO)

(72) Inventors: Thomas Sperle, Trondheim (NO); Ole Alexander Eek, Trondheim (NO)

(73) Assignee: INDUSENZ AS, Trondheim (NO)

(*) Notice: Subject to any disclaimer, the term of this patent is extended or adjusted under 35 U.S.C. 154(b) by 0 days.

(21) Appl. No.: 18/434,322

(22) Filed: Feb. 6, 2024

(65) Prior Publication Data

US 2024/0255459 A1 Aug. 1, 2024

Related U.S. Application Data

(63) Continuation of application No. 17/494,289, filed on Oct. 5, 2021, now Pat. No. 11,927,557.

(30) Foreign Application Priority Data

Oct. 6, 2020 (GB) ..................................... 2015828

(51) Int. Cl.
*G01N 27/22* (2006.01)
*G01N 25/18* (2006.01)
*G01N 25/56* (2006.01)
*G01N 27/12* (2006.01)
*G01N 27/24* (2006.01)

(52) U.S. Cl.
CPC ........... *G01N 27/223* (2013.01); *G01N 27/24* (2013.01); *G01N 25/18* (2013.01); *G01N 25/56* (2013.01); *G01N 27/121* (2013.01)

(58) Field of Classification Search
CPC ...... G01N 27/223; G01N 27/24; G01N 25/18; G01N 25/56; G01N 27/121; G01N 17/02; G01N 17/00; G01N 27/048; G01N 27/227; G01N 17/04; G01N 17/006; G01N 3/56; G01M 3/045; F17D 5/06; F17D 5/02
See application file for complete search history.

(56) References Cited

U.S. PATENT DOCUMENTS 5,214,387 A * 5/1993 Fenner .................. G01N 17/00 324/718
2013/0210154 A1* 8/2013 Dieckhoff ............. G01N 17/04 422/53
2014/0139241 A1* 5/2014 Sakai .................. G01N 27/223 324/665

FOREIGN PATENT DOCUMENTS

KR 100380113 B1 * 4/2003

* cited by examiner

*Primary Examiner* — Feba Pothen
(74) *Attorney, Agent, or Firm* — Ballard Spahr LLP

(57) ABSTRACT

The invention provides a sensor system and methods for detecting the presence of water in an insulating material surrounding plant equipment and/or pipe work. The sensor system comprises a plurality of sensors located in and spatially distributed over the insulating material, each sensor being operable to provide a sensor output indicative of the presence of water in an insulating material. The system also comprises at least one reference sensor operable to provide a reference sensor output indicative of the presence of water in an ambient environment in the vicinity of the plurality of sensors. In addition, the system comprises a processor configured to receive the sensor outputs from the plurality of sensors and the reference sensor output. The processor is configured to correlate the sensor outputs from the plurality of sensors and the reference sensor output to provide a correlation data output for use in evaluating a corrosion condition.

12 Claims, 14 Drawing Sheets

APPARATUS, SYSTEM AND METHOD FOR MONITORING EXTERNAL PROPERTIES OF PLANT EQUIPMENT AND/OR PIPE WORK

CROSS-REFERENCE TO RELATED APPLICATION

This application is a continuation of U.S. patent application Ser. No. 17/494,289, filed Oct. 5, 2021, which claims priority to and the benefit of the filing date of Application Number GB2015828.3, filed Oct. 6, 2020, each of which is incorporated herein by reference in its entirety.

FIELD OF THE INVENTION

The present invention relates to a system, apparatus and method for monitoring properties of an insulated metal structure, such as plant equipment and/or pipe work. In particular, the present invention relates to a system, apparatus and method for monitoring the external properties of and environment surrounding plant equipment and/or pipe work. One aspect of the invention relates to a system, apparatus and method for monitoring properties of insulation and/or voids which surrounds plant equipment and/or pipe work. One aspect of the invention relates to a system, apparatus and method for predicting and evaluating the risk of the occurrence of corrosion under insulation. One aspect of the invention relates to a system, apparatus and method for monitoring and/or mitigating the risk of corrosion under insulation by optimising insulation design, facility arrangements and/or maintenance programmes.

BACKGROUND TO THE INVENTION

In industry, corrosion under insulation (CUI) is a problem that occurs in almost every industrial plant having insulated metal surfaces, including pipes, vessels and tanks. The corrosive environment which these surfaces are exposed to is often varying and unknown. Insulation encases such parts, often as well as a layer of weatherproof cladding or casing. The insulation and the cladding or casing can be known to act like a water trap for water which finds itself in this environment. Amongst other problems the corrosion can lead to a reduction in wall thickness and ultimately to leaks in the system.

To monitor the condition of these surfaces, manual inspection is carried out, which typically involves opening the cladding and the insulation surrounding them. This is a resource intensive and demanding process. It can also be difficult to conduct a manual inspection where the layout of a facility includes hard to access areas. At the time of scheduling and/or conducting these inspections, the status under the cladding/insulation is unknown, and the inspection might not be required at all, or it might be long overdue.

In some cases, severe corrosion (if undetected) can lead to equipment failure or leaks, having potentially hazardous consequences such as a leak of high temperature fluid, toxic gases, high pressure gas or fluid and the risk of ignition or explosion.

If corrosion does occur, industrial plants must bear high costs for the replacement of equipment and extended downtime during this process. Logs of past corrosion occurrences, assumed risk and cost (such as the cost of accessing the location in question and of replacing the equipment involved proactively) typically determine the frequency of manual visual inspection.

SUMMARY OF THE INVENTION

There is generally a need for a method and apparatus which addresses one or more of the problems identified above.

It is amongst the aims and objects of the invention to provide a system, apparatus and method for monitoring the environment in an insulating material surrounding plant equipment and/or pipe work which obviates or mitigates one or more drawbacks or disadvantages of the prior art.

In particular, one aim of an aspect of the invention is to provide a system, apparatus and method which can be used to predict the likelihood and occurrence of corrosion under insulation on plant equipment and/or pipe work.

In particular, one aim of an aspect of the invention is to provide a system, apparatus and method which can be used to determine water ingress locations in an insulating material surrounding plant equipment and/or pipework.

It is amongst the aims and objects of the invention to provide a system, apparatus and method for optimising insulation design to mitigate the occurrence of corrosion under insulation on plant equipment and/or pipe work.

It is amongst the aims and objects of the invention to provide a system, apparatus and method which can be used to determine the exposure time of plant equipment, pipework and/or insulating material to wet and/or humid conditions.

Throughout this specification, the term water is used to mean water in any form, and includes references to vapour/humidity and free/liquid water. The term humidity is used to mean the concentration of water vapour in the air, and may refer to absolute humidity, which is the ratio of the mass of water vapour present in a given volume of air, and/or relative humidity, which is the ratio of absolute humidity to the saturated humidity level at the same temperature. The term free water and/or moisture is used to mean water in a liquid state. Although the term free water is used, the sensor may be operable to detect the presence of any fluid.

According to a first aspect of the invention there is provided a sensor system for detecting the presence of water in an insulating material surrounding plant equipment and/or pipe work, the sensor system comprising:

- a plurality of sensors located in and spatially distributed over the insulating material, each sensor being operable to provide a sensor output indicative of the presence of water in an insulating material;
- at least one reference sensor operable to provide a reference sensor output indicative of the presence of water in an ambient environment in the vicinity of the plurality of sensors; and
- a processor configured to receive the sensor outputs from the plurality of sensors and the reference sensor output;
- wherein the processor is configured to correlate the sensor outputs from the plurality of sensors and the reference sensor output to provide a correlation data output for use in evaluating a corrosion condition.

The corrosion condition may be a condition within and/or under the insulating material which is a contributor to the risk of corrosion. Other factors which may be contributors to the risk of corrosion may include, but are not limited to: temperature; the presence of chlorides; material type; coating types and ages; design factors (including plant equipment and/or pipe work topography and geometry); insulation types, conditions and ages; cladding design, types and ages; and ambient conditions. The corrosion condition may be a condition within and/or under the insulating material which relates to the likelihood of the occurrence and/or presence of corrosion under the insulating material.

The at least one reference sensor may be located externally to the insulating material in the vicinity of the plurality of sensors There may be a communications link between the plurality of sensors and the processor. The communications link may be a wireless communications link. As a result, each of the plurality of sensors may be operable to wirelessly transmit the sensor outputs to the processor.

There may be a communications link between the at least one reference sensor and the processor. The communications link may be a wireless communications link. As a result, the at least one reference sensor may be operable to wirelessly transmit the sensor outputs to the processor.

The processor may be a remote data processing and/or storage unit. The processor may comprise one or more computers. There may be flexibility as to where the computers are located, for example the computers may not need to be located locally to one another. This gives system operators the ability to select an optimum processor location or locations based on a number of factors including, but not limited to, the location of key personnel, the location of adequately powered processing means, the cost and availability of processing means in key locations and/or the strength and availability of communications links. The processor may be located remotely to the sensor system. The processor may be located locally to the sensor system.

A sensor of the plurality of sensors may comprise at least two sensing means located on an elongate body (a probe). One of the at least two sensing means may comprise the at least one reference sensor. For example, a first sensing means may be provided on a sensor probe at a position which, in use, is close to an outer surface of the insulating material. A second sensing means may be provided on the sensor probe at a position which, in use, is embedded in the insulating material at a greater depth than the first sensing means. As a result, the first sensing means may be more sensitive to ambient changes than the second sensing means and may be used to provide the reference sensor output.

According to a second aspect of the invention there is provided a sensor system for detecting the presence of water in an insulating material surrounding plant equipment and/or pipe work, the sensor system comprising:

- a plurality of sensors configured to be located in and spatially distributed over the insulating material, each sensor being operable to provide a sensor output indicative of the presence of water in an insulating material;
- at least one reference sensor operable to provide a reference sensor output indicative of the presence of water in an ambient environment in the vicinity of the plurality of sensors; and
- a processor configured to receive the sensor outputs from the plurality of sensors and the reference sensor output;
- wherein the processor is configured to correlate the sensor outputs from the plurality of sensors and the reference sensor output to provide a correlation data output for use in evaluating a corrosion condition.

Embodiments of the second aspect of the invention may include one or more features according to the first aspect of the invention, or its embodiments, or vice versa.

According to a third aspect of the invention there is provided a method of evaluating a corrosion condition of plant equipment and/or pipe work surrounded by an insulating material, the method comprising:

providing a sensor system comprising:

- a plurality of sensors located in and spatially distributed over the insulating material, each sensor being operable to provide a sensor output indicative of the presence of water in an insulating material;
- at least one reference sensor operable to provide a reference sensor output indicative of the presence of water in an ambient environment in the vicinity of the plurality of sensors; and
- a processor configured to receive the sensor outputs from the plurality of sensors and the reference sensor output:
- using the processor to correlate the sensor outputs from the plurality of sensors and the reference sensor to provide a correlation data output; and
- using the correlation data output in the evaluation of a corrosion condition.

The processor may be local to the plurality of sensors or may be remotely located. Within the scope of the invention, inputting data to the processor, and/or determining one or corrosion conditions may be performed in a remote location from the plurality of sensors, including in another international jurisdiction.

The method may comprise analysing the properties of the insulating system to determine whether one or more of the plurality of sensors is located in a substantially dry portion of the insulating material. The method may comprise identifying whether one or more of the plurality of sensors has an output which has a close correlation with/tends to follow the output of the at least one reference sensor.

The method may comprise analysing the properties of the insulating system to determine whether one or more of the plurality of sensors is located in a substantially wet portion of the insulating material. The method may comprise identifying whether one or more of the plurality of sensors has an output which is not closely correlated to/which deviates from the output of the at least one reference sensor.

The method may comprise analysing the properties of the insulating system to determine whether the system is not airtight. The method may comprise identifying whether one or more of the plurality of sensors has an output which has a close correlation with/tends to follow the output of the at least one reference sensor.

The method may comprise analysing the properties of the insulating system to determine whether the system is airtight. The method may comprise identifying whether one or more of the plurality of sensors has an output which is not closely correlated to/which deviates from the output of the at least one reference sensor.

The method may comprise analysing the properties of the insulating system to determine the general location of a water ingress point. The method may comprise identifying whether one or more of the plurality of sensors, at a point or points in time, has an output which is not closely correlated to/which deviates from the output of the at least one reference sensor, which may be following an increase in the readings from the plurality of sensors and the at least one reference sensor.

Embodiments of the third aspect of the invention may include one or more features according to the first or second aspects of the invention, or their embodiments, or vice versa.

According to a fourth aspect of the invention there is provided a method of evaluating a corrosion risk of a metal structure surrounded by an insulating material, the method comprising:

providing a sensor system comprising:

- a plurality of sensors located in and spatially distributed over the insulating material, wherein each sensor is operable to provide a sensor output indicative of the presence of water in the insulating material;

obtaining output data from the sensor system;

inputting the output data from the sensor system into a corrosion evaluation model, the model being suitable for evaluating corrosion risk; and using the model to provide an evaluation of the corrosion risk of the metal structure.

The evaluation of the corrosion risk may relate to the environment for corrosion surrounding the metal structure, including in and/or under the insulating material.

The sensor system may further comprise a processor which may receive the sensor outputs from the plurality of sensors. The sensor system may further comprise at least one reference sensor operable to provide a reference sensor output indicative of the presence of water in an ambient environment in the vicinity of the plurality of sensors. The processor may receive the reference sensor output. The processor may correlate the sensor outputs from the plurality of sensors and the reference sensor output to provide a correlation data output for use in evaluating a corrosion condition. The output data from the sensor system may be received via the processor. The output data from the sensor system may be the corrosion condition, which may be a condition within and/or under the insulating material which is a contributor to the risk of corrosion. The corrosion condition may relate to the likelihood of the occurrence and/or presence of corrosion under the insulating material.

The presence of water in the insulating material is a contributor to the risk of corrosion. Other factors which may be contributors to the risk of corrosion may form inputs to the model. The model may comprise one or more additional inputs selected from the group comprising: temperature; the presence of chlorides; material type; coating types and ages; design factors (including plant equipment and/or pipe work topography and geometry); insulation types, conditions and ages; cladding design, types and ages; and ambient conditions.

The method may comprise determining the probability and/or the likelihood of failure of the metal structure due to corrosion under insulation.

The sensor outputs may be real-time, continuous sensor outputs which may be inputted into the model.

Embodiments of the fourth aspect of the invention may include one or more features according to the first to third aspects of the invention, or their embodiments, or vice versa.

According to a fifth aspect of the invention there is provided a method of evaluating a corrosion risk of a metal structure surrounded by an insulating material, the method comprising:

receiving output data from a sensor system comprising at least one sensor for detecting the presence of water in the insulating material;

inputting the output data from the sensor system into a corrosion evaluation model suitable for evaluating corrosion risk; and using the model to provide an evaluation of the corrosion risk of the metal structure.

The evaluation of the corrosion risk may relate to the environment for corrosion surrounding the metal structure, including in and/or under the insulating material.

The sensor system may further comprise a processor which may receive the sensor outputs from the at least one sensor. The sensor system may further comprise at least one reference sensor operable to provide a reference sensor output indicative of the presence of water in an ambient environment in the vicinity of the at least one sensor. The processor may receive the reference sensor output. The processor may correlate the sensor outputs from the at least one sensor and the reference sensor output to provide a correlation data output for use in evaluating a corrosion condition. The output data from the sensor system may be received via the processor. The output data from the sensor system may be the corrosion condition, which may be a condition within and/or under the insulating material which is a contributor to the risk of corrosion. The corrosion condition may relate to the likelihood of the occurrence and/or presence of corrosion under the insulating material.

The corrosion risk may relate to the likelihood of the occurrence and/or presence of corrosion under the insulating material. The method may comprise determining the probability and/or the likelihood of failure of the metal structure due to corrosion under insulation.

The output data from the sensor system may provide information relating to water wetting of the metal structure as an input to the model. Additional information relating to the water wetting of the metal structure may also be input into the model. For example, where the insulation is surrounded by a cladding, the design of the cladding, including the location of any drain holes, is a factor which can be accounted for. Other properties of the cladding, such as its material, age and condition may also be considered.

The presence of water in the insulating material is a contributor to the risk of corrosion. Other factors which may contribute to the risk of corrosion may be input into the model. The model may comprise additional inputs which may comprise information and/or data relating to one or more factors selected from the group comprising: material, coating and design. The material input may include factors such as the material from which the structure is formed and/or associated temperatures. The coating input may include factors relating to coatings applied to the surface of the metal structure (i.e. paint or a corrosion resistant paint) such as the material from which a coating of the metal structure is formed and the age of the coating. The design input may include factors such as metal structure wall thicknesses, metal structure dimensions (for example, pipe diameters where the metal structure is a pipe) and non-destructive testing (NDT) results.

The method may comprise quantifying the sensor outputs into a value which may relate to the likelihood of the occurrence and/or presence of corrosion under the insulating material. Where there are additional inputs into the model, the method may comprise quantifying the additional inputs into values which may relate to the likelihood of the occurrence and/or presence of corrosion under the insulating material. The method may comprising combining the values relating to the likelihood of the occurrence and/or presence of corrosion under the insulating material from the model inputs to provide an overall value for the likelihood of the occurrence and/or presence of corrosion under the insulating material and/or the probability of failure of the metal structure due to corrosion under insulation.

Embodiments of the fifth aspect of the invention may include one or more features according to the first to fourth aspects of the invention, or their embodiments, or vice versa.

According to a sixth aspect of the invention there is provided a method of evaluating a corrosion risk of a metal structure surrounded by an insulating material, the method comprising:

providing a sensor system according to the first aspect of the invention:

obtaining a correlation data output from the sensor system;

inputting the correlation data output from the sensor system into a corrosion evaluation model, the model being suitable for evaluating corrosion risk; and using the model to provide an evaluation of the corrosion risk of the metal structure.

Embodiments of the sixth aspect of the invention may include one or more features according to the first to fifth aspects of the invention, or their embodiments, or vice versa.

According to a seventh aspect of the invention, there is provided a sensor for detecting humidity and/or free water, the sensor comprising:

a means for detecting the presence of humidity; and a means for detecting the presence of free water;

wherein the sensor is operable to provide a sensor output indicative of the presence of free water and/or humidity.

Throughout this specification, the term water is used to mean water in any form, and includes references to vapour/humidity and free/liquid water. The term humidity is used to mean the concentration of water vapour in the air, and may refer to absolute humidity, which is the ratio of the mass of water vapour present in a given volume of air, and/or relative humidity, which is the ratio of absolute humidity to the saturated humidity level at the same temperature. The term free water and/or moisture is used to mean water in a liquid state. Although the term free water is used, the sensor may be operable to detect the presence of any fluid.

The sensor may comprise a body.

The means for detecting the presence of free water may comprise at least two electrodes spaced apart from one another on the body portion, and may comprise a means for determining the capacitance value between the at least two electrodes. A dielectric property of a material between the least two electrodes may be indicative of its water content, such that the capacitance value between the two electrodes may represent the presence of free water in the material. A change in capacitance value between the at least two electrodes may be affected when the water content of the material changes.

The humidity sensing means may be provided in the body of the sensor. The body of the sensor may comprise an air channel. The air channel may be located at least between the humidity sensing means and an exterior surface or surfaces of the body, such that the humidity sensing means may be in fluid communication with an exterior environment surrounding the body of the sensor via the air channel.

The sensor may be used for detecting the presence of humidity and/or free water in and/or surrounding an insulating material, The material between the least two electrodes may be an insulating material.

The humidity sensing means may comprise any suitable humidity sensing means. The humidity sensing means may comprise a humidity sensor chip. The humidity sensing means may comprise a capacitive sensing element. The humidity sensing means may further comprise a temperature sensing means. The humidity sensing means may comprise a resistive sensing element. The humidity sensing means may comprise a thermal conductivity sensing element.

Embodiments of the seventh aspect of the invention may include one or more features according to the first to sixth aspects of the invention, or their embodiments, or vice versa.

According to an eighth aspect of the invention, there is provided a sensor system for monitoring the presence of humidity and/or free water in an insulating material, the sensor system comprising:

a plurality of sensors according to the seventh aspect of the invention;

wherein the plurality of sensors is located in and spatially distributed over the insulating material.

Each of the plurality of sensors may be operable to wirelessly transmit their outputs to a processor. The processor may be a remote data processing and/or storage unit. The processor may be a computer.

Embodiments of the eighth aspect of the invention may include one or more features according to the first to seventh aspects of the invention, or their embodiments, or vice versa.

According to a ninth aspect of the invention there is provided a method of assessing the source of water in an insulating material, the method comprising:

providing a sensor system comprising a plurality of sensors located in and spatially distributed over the insulating material;

wherein each sensor of the plurality of sensors is operable to provide a sensor output indicative of the presence of water in an insulating material; and wherein the location of each sensor of the plurality of sensors on the insulating material is known;

obtaining the sensor outputs from the plurality of sensors; and assessing whether the presence of water in the insulating material is a result of local water ingress or of water propagation from a distant ingress point or points based on analysis of the sensor outputs.

The method may comprise obtaining location data from each of the sensors of the plurality of sensors, corresponding to the location of each sensor on the insulating material. The method may comprise manual input of location data corresponding to the location of each sensor on the insulating material.

The method may comprise detecting the occurrence of peak sensor outputs. The method may comprise determining the location of the sensor or sensors providing the peak outputs.

The method may comprise detecting the occurrence of a pattern or patterns in the outputs obtained from multiple sensors of the plurality of sensors. The method may comprise determining the location of the sensor or sensors providing patterns in the outputs.

Each sensor of the plurality of sensors may be operable to provide a sensor output indicative of the presence of free water and/or humidity.

The method may comprise monitoring and/or recording the sensor outputs obtained from each sensor of the plurality of sensors over a set period of time.

The pattern or patterns in the sensor outputs may provide an indication of water propagation from a distant ingress point or points. The pattern may be a pattern of decaying or decreasing sensor outputs obtained from neighbouring sensors.

The insulating material may be provided on and/or around plant equipment and/or pipe work.

Factors relating to the layout of the insulating material may be accounted for in the method. Factors relating to the layout of the plant equipment and/or pipe work may be accounted for in the method. The method may comprise manually assessing locations of the plant equipment and/or pipe work layout that are deemed to be more susceptible to humidity and/or free water exposure, for example, a lowermost section in a vertical or substantially vertical arrangement may be assessed as being more susceptible to exposure by virtue of the possibility of water moving under the influence of gravity and pooling in this area. Another example of a location which may be deemed to be more susceptible to exposure may be at the base of a vertical U-bend in a pipe work system.

Embodiments of the ninth aspect of the invention may include one or more features according to the first to eighth aspects of the invention, or their embodiments, or vice versa.

According to a tenth aspect of the invention there is provided a method of determining the location of insulation barriers in an insulation system, the method comprising:

- providing a sensor system comprising a plurality of sensors located in and spatially distributed over an insulating material;
- wherein each sensor of the plurality of sensors is operable to provide a sensor output indicative of the presence of water in an insulating material; and
- wherein the location of each sensor of the plurality of sensors on the insulating material is known;
- obtaining the sensor outputs from the plurality of sensors;
- assessing which locations are exposed to water as a result of water propagation from a distant ingress point or points based on the sensor outputs;
- assessing the location or approximate location of the ingress point or points based on the sensor outputs; and
- installing an insulation barrier between the ingress point or points and the locations exposed to water as a result of water propagation from a distant ingress point or points to mitigate or reduce the risk of corrosion under insulation.

Installation of an insulating barrier may, as a consequence, minimise the resources spent on replacing wet or damaged insulation.

Embodiments of the tenth aspect of the invention may include one or more features according to the first to ninth aspects of the invention, or their embodiments, or vice versa.

According to an eleventh aspect of the invention there is provided a sensor system for detecting the presence of water at a plurality of depth locations within an insulating material, the sensor system comprising:

- a first sensing means and a second sensing means;
- wherein the first sensing means is operable to provide a first sensor output indicative of the presence of water at a first depth location in the insulating material; and
- wherein the second sensing means is operable to provide a second sensor output indicative of the presence of water at a second depth location in the insulating material;
- wherein the sensor system comprises at least one sensor having an elongate body configured to be inserted into an insulating material;
- wherein the first sensing means is located on the elongate body; and
- wherein the first depth location corresponds to the location of the first sensing means on the elongate body.

The term water is used to mean water in any form, and includes references to vapour/humidity and free water. The sensor output may be a reading relating to humidity and/or may be a reading relating to free water.

The system may comprise additional sensing means. The system may comprise a sensing means corresponding to each depth location of the plurality of depth locations. For example, the system may comprise a third sensing means, may comprise a fourth sensing means and may comprise a fifth sensing means.

The plurality of depth locations may comprise additional depth locations. For example, the plurality of depth locations may comprise a third depth location, may comprise a fourth depth location and may comprise a fifth depth location.

The depth of the insulating material may correspond to its thickness in a direction between the insulated surface and the outer surface of the insulating material (or materials).

The plurality of depth locations may correspond to a plurality of radial locations in the insulating material. This may be the case where the insulating material encases circular, tubular, cylindrical and/or spherical plant equipment and/or pipe work and, as a consequence, may have a generally cylindrical cross-section.

The at least one sensor may be capable of detecting the presence of humidity and/or free water in an insulating material.

The sensor system may comprise a single sensor. The second sensing means may be located on the elongate body of the at least one sensor. The first sensing means and the second sensing means may be positioned at different locations on the elongate body of the at least one sensor. The at least one sensor may therefore be operable to detect the presence of water at more than one position along the length of the elongate body.

The sensor system may comprise multiple sensors. The multiple sensors may comprise elongate bodies of differing lengths. The second sensing means may be provided on an elongate body of a second sensor. The first sensing means and the second sensing means may be positioned at different locations on the elongate bodies of the first sensor and the second sensor, respectively.

The sensing means may comprise a capacitive sensing means. The sensing means may comprise at least two electrodes spaced apart from one another on the body portion, and may comprise a means for determining the capacitance value between the at least two electrodes. A dielectric property of a material between the least two electrodes may be indicative of its water content, such that the capacitance value between the two electrodes may represent the presence of free water in the material. A change in capacitance value between the at least two electrodes may be affected when the water content of the material changes. The sensing means may comprise a resistive sensing element. The sensing means may comprise a thermal conductivity sensing element.

Embodiments of the eleventh aspect of the invention may include one or more features according to the first to tenth aspects of the invention, or their embodiments, or vice versa.

According to a twelfth aspect of the invention there is provided a method of detecting the presence of water at a plurality of depth locations within an insulating material, the method comprising:

- providing a sensor system according to the eleventh aspect of the invention; and
- obtaining sensor outputs from each of the sensing means, wherein the first depth location and the second depth location are known.

The location of each of the sensing means on the elongate body or bodies of the at least one sensor may be known.

The method may comprise determining, based on the location of each of the sensing means on the elongate body or bodies of the one or more sensors, the depth location of the sensing means in the insulating material.

The method may comprise linking the sensor outputs from each sensing means to the determined location of the sensing means.

The outputs obtained from the sensor system may be used to construct a profile of water readings throughout the depth of the insulating material. The outputs obtained from the sensor system may be used to produce a model or a plot representing water readings throughout the depth of the insulating material.

The sensor system may comprise a plurality of sensors spatially distributed over an insulating material. The outputs obtained from the sensor system may be used to produce a model or a plot representing how water readings throughout the depth of the insulating material change at different, spatially distributed locations of the insulating material.

The insulating material may be located on or around plant equipment and/or pipe work.

Embodiments of the twelfth aspect of the invention may include one or more features according to the first to eleventh aspects of the invention, or their embodiments, or vice versa.

According to a thirteenth aspect of the invention there is provided a sensor mounting apparatus, the apparatus comprising:

- a body comprising at least one outer wall and an internal cavity for receiving at least part of a sensor;
- wherein the body is configured to be installed in the insulating material, such that it penetrates the insulating material;
- wherein the apparatus is configured to removably mount a sensor within the insulating material; and
- wherein the apparatus is configured to provide a channel through which the at least part of a sensor and the insulating material are in fluid communication, in use At least one aperture may be provided in the body. The at least one aperture may be provided in the at least one outer wall of the body and may be in fluid communication with the cavity of the body. The at least one aperture may be configured to provide the channel through which the at least part of a sensor and the insulating material are in fluid communication, in use.

When installed, the body of the sensor mounting apparatus may not extend throughout the entire thickness of the insulation and may only partially penetrate the thickness of the insulation.

The sensor mounting apparatus may be configured to removably mount at least part of a sensor within an insulating material comprising a plurality of layers. The body of the sensor mounting apparatus may be configured to be installed in the insulating material, such that it penetrates at least two layers of the insulating material. The at least one outer wall may be configured to form a seal between the at least two layers of the insulating material.

Embodiments of the thirteenth aspect of the invention may include one or more features according to the first to twelfth aspects of the invention, or their embodiments, or vice versa.

According to a fourteenth aspect of the invention there is provided a method of mounting a sensor in an insulating material, the method comprising:

- providing a sensor mounting apparatus according to the thirteenth aspect of the invention;
- installing the sensor mounting apparatus in an insulating material; and
- inserting at least part of a sensor into a cavity in the body of the sensor mounting apparatus.

Embodiments of the fourteenth aspect of the invention may include one or more features according to the first to thirteenth aspects of the invention, or their embodiments, or vice versa.

According to a fifteenth aspect of the invention there is provided a sensor for detecting the presence of water in an insulating material comprising a plurality of layers, the sensor comprising:

- an elongate body; and
- at least one sensing means located on the elongate body;
- wherein elongate body is configured to be inserted into the insulating material such that it penetrates at least two layers of the insulating material; and
- wherein the elongate body is operable expand and form a seal between the at least two layers of the insulating material upon or following installation of the sensor.

When installed, the body of the sensor mounting apparatus may not extend throughout the entire thickness of the at least two layers of insulating material and may only partially penetrate the thickness of the insulation.

A part of the elongate body may be operable to expand and form a seal. Multiple parts of the elongate body may be operable to expand and form a seal. Alternatively, the entire elongate body may be operable to expand and form a seal.

The elongate body may comprise an expandable material. The elongate body may be surrounded, or partially surrounded by an expandable material. The expandable material may be a foam. The expandable material may be triggered to expand when exposed to water and/or when exposed to air and/or when exposed to a certain temperature.

The elongate body may comprise a compressible material. The elongate body may be surrounded, or partially surrounded by a compressible material. The compressible material may be compressed in an initial condition and may be triggered to expand when the compressive force is removed. The compressible material may be a foam.

Embodiments of the fifteenth aspect of the invention may include one or more features according to the first to fourteenth aspects of the invention, or their embodiments, or vice versa.

According to a sixteenth aspect of the invention there is provided a method of installing a sensor in an insulating material comprising a plurality of layers, the method comprising:

- providing a sensor comprising an elongate body and at least one sensing means located on the elongate body, wherein the elongate body is operable expand and form a seal between the at least two layers of the insulating material upon or following installation of the sensor;
- inserting the elongate body of the sensor into the insulating material such that it penetrates at least two layers of the insulating material; and
- triggering expansion of the elongate body and forming a seal between the at least two layers of insulating material with said expansion.

Embodiments of the sixteenth aspect of the invention may include one or more features according to the first to fifteenth aspects of the invention, or their embodiments, or vice versa.

According to a seventeenth aspect of the invention, there is provided a method of producing a corrosion model of a metal structure surrounded by an insulating material, the method comprising:

- a) generating an initial corrosion model based on data obtained from at least one sensor installed in the insulating material surrounding the structure for monitoring the presence of humidity and/or free water and/or temperature in the insulating material;
- b) obtaining corrosion inspection data relating to the structure; and c) correlating the inspection data against the initial corrosion model to generate an updated corrosion model.

The metal structure may be a pipe or piece of plant equipment.

The initial corrosion model may comprise theoretical data inputs. The theoretical data may include data obtained from calculations relating to the insulating environments and/or the geometry or topology of structure which it surrounds. This data might also include information, data and/or values obtained from literature.

The corrosion inspection data may be obtained by conducting a visual inspection of the structure.

The method may comprise repeating steps (b) and (c). The steps may be repeated at a later time or times.

The method may comprise:

d) obtaining new corrosion inspection data relating to the structure; and e) correlating the inspection data against the updated corrosion model to generate a new updated corrosion model.

The method may comprise repeating steps (d) and (e). The steps may be repeated at a later time or times.

Embodiments of the seventeenth aspect of the invention may include one or more features according to the first to sixteenth aspects of the invention, or their embodiments, or vice versa.

According to an eighteenth aspect of the invention, there is provided a metal structure surrounded by an insulating material, the method comprising:

a) performing the method according to the seventeenth aspect of the invention;

b) producing a maintenance and inspection programme based on the periodically updated corrosion model, the inspection data and the data obtained from at least one sensor.

Embodiments of the eighteenth aspect of the invention may include one or more features according to the first to seventeenth aspects of the invention, or their embodiments, or vice versa.

BRIEF DESCRIPTION OF THE DRAWINGS

There will now be described, by way of example only, various embodiments of the invention with reference to the drawings, of which.

DETAILED DESCRIPTION OF PREFERRED EMBODIMENTS

Figure 1:
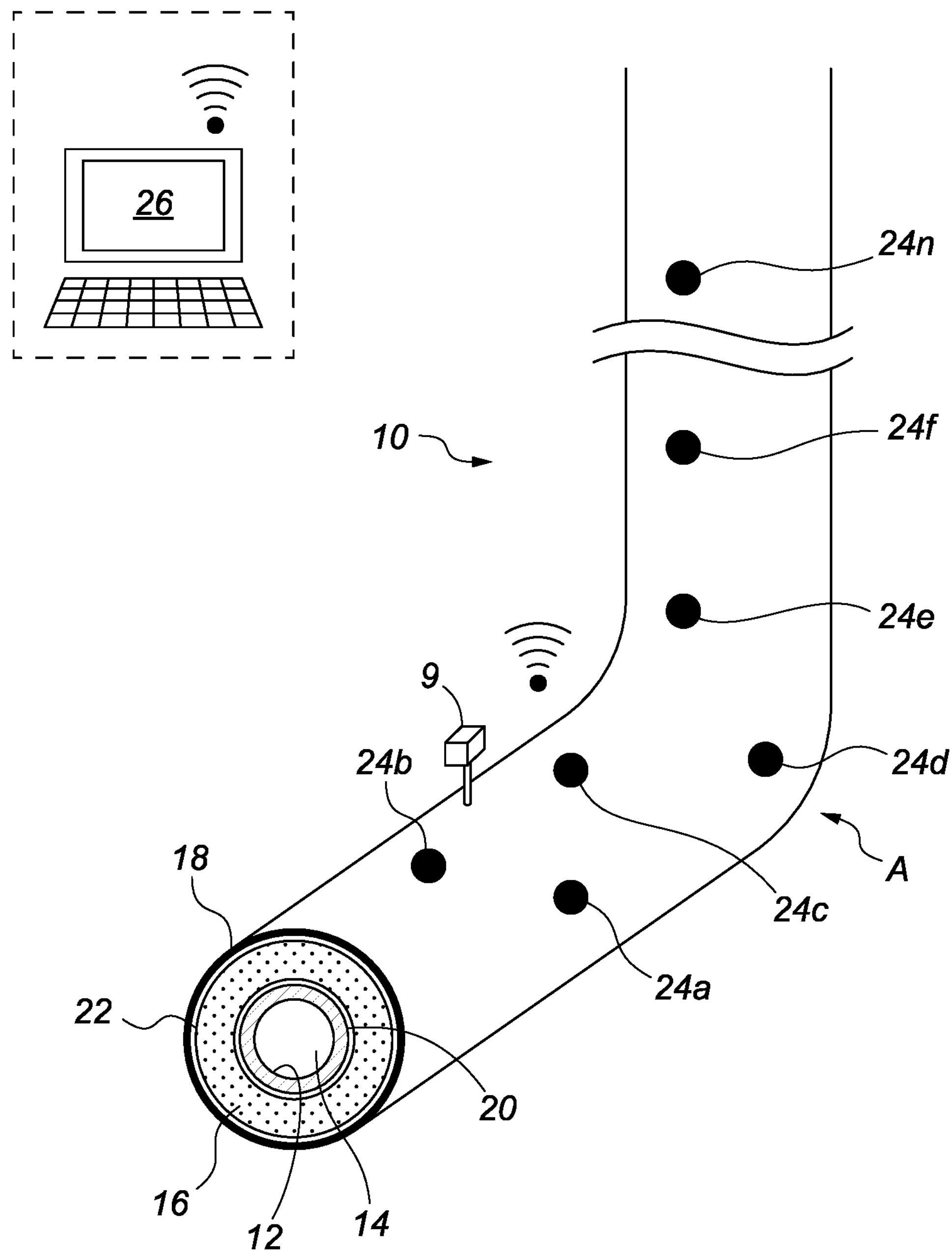
FIG. 1 is a schematic representation of a sensor system according to an embodiment of the invention.

Referring firstly to FIG. 1, there is shown schematically a sensor system according to an aspect of the invention. The sensor system, shown generally at 10, is installed upon an insulated pipe 12. Part of the insulated pipe 12 has been cut away to more clearly display its various layers.

The pipe 12 carries a flowing medium (not shown) within its flow bore 14. The pipe 12 is surrounded by a layer of insulation 16, which is in turn surrounded by a layer of weatherproof protective cladding 18. In this example, air voids 20 and 22 are also present between the outer surface of the pipe and the inner surface of the insulation, and between the outer surface of the insulation and the inner surface of the cladding, respectively. It will be appreciated that air voids may not be present in alternative pipeline arrangements, or that the presence of air voids may not be continuous over the length of a pipe. Air voids may be present in some areas whilst being absent in others, and may develop or disappear over the course of time. In addition, although a weatherproof cladding 18 is shown, it will be appreciated that this may be omitted in some systems.

The system 10 includes a number of sensors 24 *a*, 24 *b*, 24 *c*, 24 *d*. 24 *e*, 24 *f* . . . 24 *n* distributed over the length of the pipe 12. The pipe 12 is an existing pipe to which the sensor system has been retrofit. To install the sensors, holes (not shown) were made in the cladding 18 at the intended location of each sensor 24 *a-n*. Each sensor has a rod-shaped probe (not shown) which has been inserted through holes in the cladding and embedded into the insulation 16 surrounding the pipe 12. In FIG. 1, the sensor system is shown schematically, following its installation. As such, only the external part of each sensor can be seen 24 *a-n*. The types of sensors that can be used in this sensor system are described in more detail with reference to FIGS. 2A, 28, 10 and 11A.

The sensors 24 *a-n* which make up the system can detect and measure the presence of free water, humidity or both. The sensors may also be operable to obtain temperature measurements, and/or separate temperature sensors might be provided within the system. These parameters are all linked to the occurrence of CUI, and can be used to build up a predictive model of when and where corrosion will occur in the system. For example, high humidity readings might pinpoint a problem area at which CUI is likely to occur. These factors can also indicate the presence of leaks from pipes, such as steam tracing tubes surrounding the pipe, and can be monitored for the purpose of leak identification.

The system 10 also includes one or more reference (or ambient) sensors 9. The reference sensor 9 is used to take readings from the environment surrounding the monitored component (in this case, pipe 12) which can be factored into the data collected from the sensors 24 *a-n* and any data processing or calculation that is performed using the sensor data.

A purpose of the reference sensor 9 is to monitor ambient humidity. The reference sensor 9 could, for example, pick up daily fluctuations in humidity and/or fluctuations depending on weather conditions experienced. The ambient environment surrounding a pipe can influence the data obtained by the pipe sensors 24 *a-n* and use of the reference sensor 9 to obtain real-Lime data relating to the ambient conditions can help to compensate for these fluctuations. In some cases, there can be a delay between changes in the ambient environment (for example, due to a change in weather) and the data picked up by the pipe sensors 24 *a*-24 *n*.

The inventors have appreciated that the use of one or more reference sensors to obtain reference data can lead to effective processing of the sensor system readings. Reference sensor(s) and their importance to the system are described in more detail with reference to FIGS. 4A to 4C and the accompanying description.

The sensors 24 *a-n* are operable to wirelessly transmit readings taken from the insulation and/or the air voids surrounding the pipe 12 to a computer 26, where the data can be stored, analysed and/or further processed. Readings are transmitted to the computer 26 in real time. For example, readings are sent to the computer at selected rate, such as once per hour. The selected rate may be based on a monitoring rate that is deemed suitable for CUI prediction purposes.

Although a computer is shown in this example, it will be appreciated that any other type of remote processing and/or storage means may be used. The wireless link between the sensor system and the computer can be via any suitable communications protocol such as the internet or a wireless or mobile communications protocol.

The sensors 24 *a-n* can be placed at any position along the pipe and at any point, or points, around its circumference. Initial sensor placement might, for example, be determined based on the layout of the facility, with a higher concentration of sensors being provided in areas which are thought to present a higher risk of CUI. This determination could be based on the layout of the facility, taking into account areas of the pipeline which are at a greater risk to water ingress or which deal with a high temperature medium flowing through the pipe. The orientation of a pipe might also factor into this determination, as the base of a vertically oriented section—such as the bend indicated generally by the arrow A in FIG. 1—would be a likely area for free water from the insulation environment above this location to accumulate under the influence of gravity.

The location of each of the sensors 24 *a-n* with respect to the pipe is known to the processing means, either by manually inputting location data corresponding to each sensor 24 *a-n* when establishing the system or by equipping each sensor 24 *a-n* with a location tag or identifier (for example, using GPS) which can be determined by the processing means.

By monitoring the readings obtained from the sensors and the reference sensor (or sensors) a picture can be built up of the environment in and under the insulation surrounding the pipe. In particular, this data can be used to determine whether an environment in which CUI is likely to occur exists, or whether this is likely to exist in the future.

Following its collection, the data can be analysed manually by operators and/or automatically by the computer. For example, the data may be fed into a model which provides an overall profile of water readings along the length of the pipe and, in some cases, throughout the depth of the insulation (i.e. in the case of a pipe, radially outward from the pipe). A digital twin—a digital replica of a physical asset—could be constructed of the pipe, to provide a real-time indication of the insulating environment, and a real-time estimation of CUI.

The sensor system readings can also be inputted into a risk-based inspection (RBI) programme for a plant, which the plant operator can use to categorise the risk of certain areas in a plant and to plan repair, maintenance and inspection strategies accordingly. This can save time and money by avoiding carrying out inspections in low risk areas, or by reducing their frequency. Ultimately, this can allow users to make decisions based on an optimisation of cost versus risk. Prompts and alarms can be programmed to alert a user if readings from the sensor system exceed or drop below pre-determined values. Therefore, not only is the sensor system suitable for monitoring the environment for predicting CUI, it is also able to pick up on unexpected changes, such as changes in the temperature or humidity and/or the amount of free water in the insulation environment, which might have occurred as a result of holes in the cladding and/or the insulation, leaks from the pipe or from surrounding steam trace tubes or other pipes, or other general damage to the facility.

The data recorded by the system can be used to determine a number of factors, including: how to optimise the design of the insulation to reduce the occurrence of CUI; when and where to conduct a physical inspection of the system; where to locate additional sensors (i.e. CUI critical areas or safety critical zones, such as high pressure or explosive gas carrying zones) and where to reduce the number of sensors placed (i.e. low risk CUI areas).

This type of system is suitable for installation in a “greenfleid” (or new) plant or asset or in a “brownfield” (or existing) plant or asset.

Figure 2:
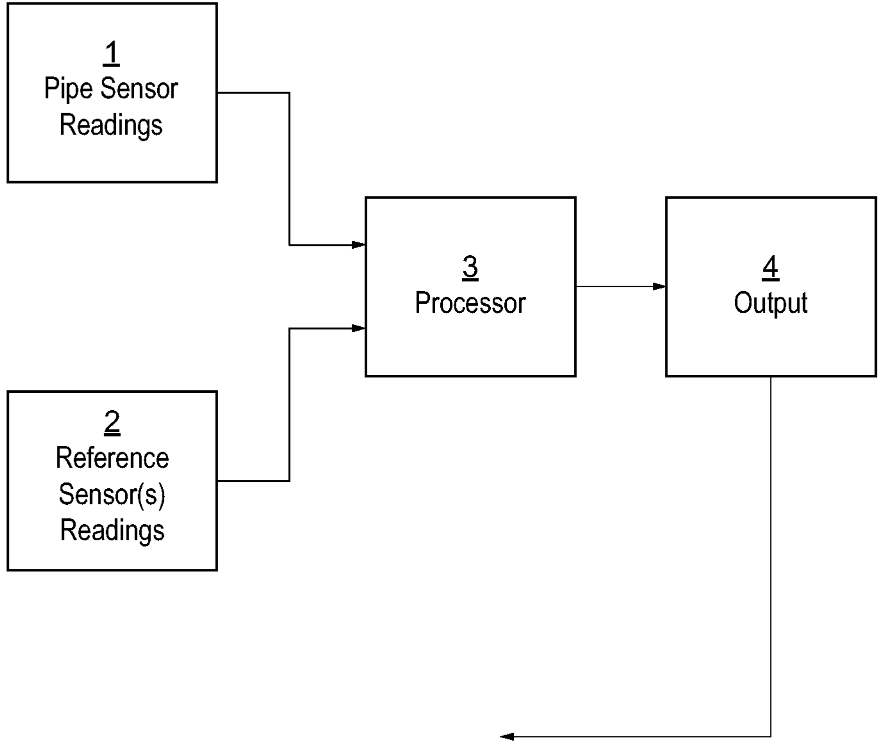
FIG. 2 is a schematic representation of the operation of a sensor system according to an embodiment of the invention.

FIG. 2 provides a visual representation of the operation of a sensor system according to an embodiment of the invention, including that of FIG. 1. The pipe sensor readings 1 and the reference sensor readings 2 are wirelessly sent to a processor 3 which is located remotely from the sensor system. Amongst other things, the processor can be operated to correlate the pipe sensor readings 1 and the reference sensor readings 2 and provide an associated output 4. The output 4 can include other data or, alternatively, the processor 3 can generate multiple outputs. The output 4 or outputs of the processor can be used to form inputs into a wider corrosion model, relating to the likelihood of CUI on the pipe. The processor output 4 can of course be used in different models, or further processed to obtain information as desired. For example, to pinpoint water ingress points to the insulating system.

Figure 3A:
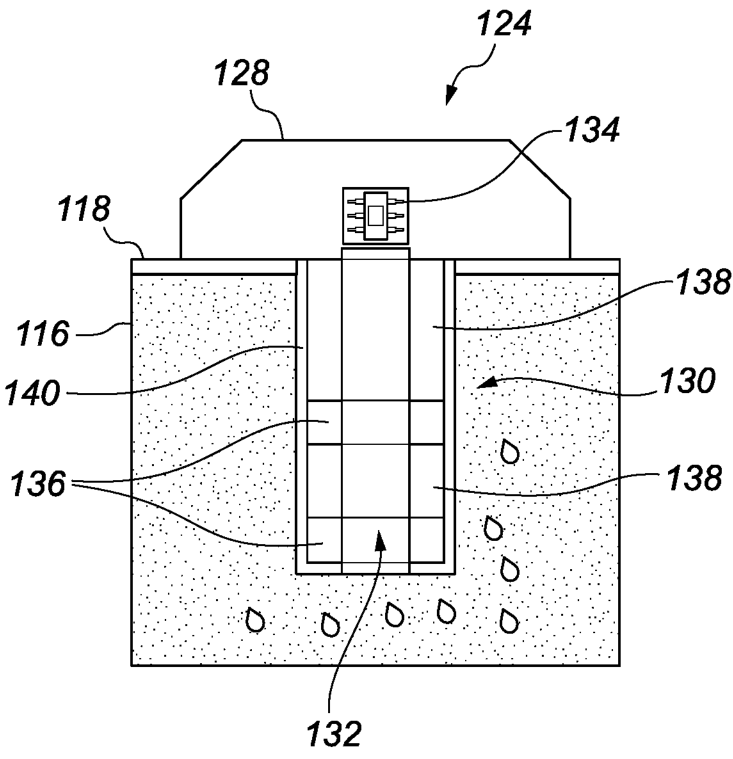
FIGS. 3A and 3B are schematic side and base views, respectively, of a sensor according to an embodiment of the invention.
Figure 3B:
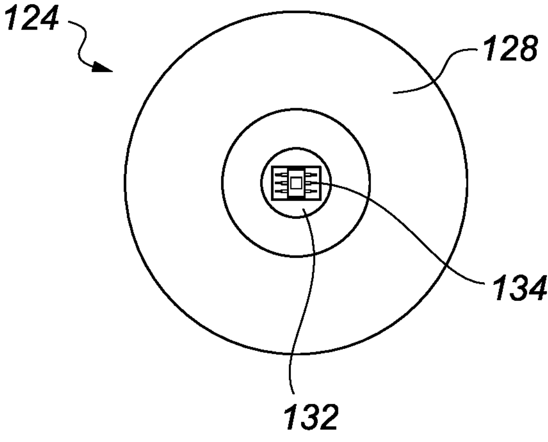

Referring now to FIGS. 3A and 3B, there is shown a side and bottom view of a sensor according to an embodiment of the invention. In FIG. 3A the sensor is shown installed in an insulating material, whereas FIG. 3B shows the sensor in isolation. This type of sensor is suitable for being employed in the sensor system of FIG. 1. The sensor 124 is a wireless sensor, capable of taking real-time readings, such as that described above with reference to FIG. 1.

The sensor 124 is shown installed in an insulating material 116 surrounding a pipe or piece of plant equipment. The sensor 124 comprises a rod-shaped probe, shown generally at 130 which extends through a pre-made hole in the cladding 118 (not shown) and penetrates the insulation 116, in use. The sensor also comprises an upper or external body part 128 which is configured to engage the outer surface of the cladding 118. The external part 128 can be used to mount the sensor, or hold the sensor in place, using any suitable means. For example, its underside may be adhered or screwed to the outer surface of the cladding 118 or insulation 116. Alternatively, the probe 130 itself or a section thereof (such as an upper section) might be provided with an external self-tapping screw thread to hold it into place in the insulation.

The external body part 128 can be adapted to house sensor parts and electronics. In FIGS. 3A and 3B, the external body part of the sensor is shown as being substantially disc-shaped; however, this part can have various shapes and sizes, or may be omitted altogether in alternative configurations of the sensor.

The sensor 124 is capable of detecting both free water and humidity. Throughout this specification, the term humidity is used to mean relative humidity. That is, the ratio of absolute humidity (the ratio of the mass of water vapour present in a given volume of air) to the saturated humidity level at the same temperature. The term free water is used to mean water in a liquid state. To measure and detect both of these properties, the sensor 124 utilises a combination of free water and humidity sensing technologies.

It is beneficial to distinguish between the presence of free water and humidity at a known location, rather than simply detecting the presence of water (which could be either humidity/vapour or water in its liquid form), for a number of reasons. For example, the presence of free water is likely to indicate a more aggressive atmosphere in terms of the likelihood of CUI occurring. Free water and humidity may also migrate through the insulation environment surrounding a pipe or other equipment at different rates, and in different manners depending on the facility layouts. CUI predictions can therefore be enhanced in this knowledge. However, it will be appreciated that sensors which determine humidity alone or free water alone, or which detect each of these properties in an alternative manner can also be used in the sensor system. In some operating environments, the external environment surrounding a pipe or piece of plant equipment can be of high relative humidity. In such scenarios, a humidity reading from the sensors might not actually indicate the presence of humidity in or surrounding the insulation, but rather that the sensor readings are influenced by the ambient environment (in other words, the sensor system can provide a false positive). However, the detection of free water in such cases provides a certain indication that water is present in the system and an environment for the occurrence of CUI might exist. As described above, in any of the systems and arrangements described herein, including in systems such as this, reference measurements may be taken of the external environment surrounding the monitored component (such as ambient temperature and relative humidity) and factored into corrosion estimations and predictions.

The sensor probe 130 comprises a substantially tubular body defining an internal air channel, shown generally at 132. The air channel 132 provides an unobstructed path between a humidity sensor chip 134 housed in the external body part 128 of the sensor 124 and the insulating material 116, when the sensor 124 is installed. The humidity sensor chip 134 is exposed to the atmosphere inside the insulation 116 via the air channel 133.

A humidity sensor chip 134 comprises a capacitive sensing element comprising two capacitor electrodes (not shown) with a hygroscopic dielectric material positioned between them (not shown). The dielectric constant of the hygroscopic dielectric material varies when it is subjected to a change in humidity, which in turns changes the capacitance value between the two electrodes. The humidity sensor chip 134 also comprises a temperature sensing means. Combining the humidity and temperature readings—both obtained by the humidity sensor chip 134 via its exposure to the insulation 116 atmosphere via the air channel 132—allows the relative humidity to be determined by the chip 134. Although the humidity sensor chip is described in this example as comprising a capacitive sensing element, it will be appreciated that any known and suitable means of detecting humidity may be used. For example, the humidity sensor chip may employ resistive and/or thermal conductivity sensing methods.

The presence of free water is also determined by the sensor 124 using a capacitive sensing technique. To this end, a pair of electrodes 136 are provided on the sensor probe 130. The electrodes 136 are shaped as annular discs surrounding the air channel 132.

In the case of free water detection, the insulating material 116 itself-either dry or soaked in water-surrounding the electrodes 136 of sensor 124 forms the dielectric material. As the dielectric constant of water is proportionally much greater than the dielectric constant of air, the presence of free water in the insulating material is recognizable by the sensor 124. In alternative embodiments of the invention, the electrodes 136, and/or additional sensing elements provided on the probe, are also capable of detecting changes in humidity. In such embodiments, the humidity sensor chip 134 may not be provided.

To avoid direct current flow from one electrode 136 to the other 136 through the free water (if present), the surfaces of the electrodes 136 are insulated from one another using, for example, an epoxy coating or similar. This also protects the electrodes 136 from galvanic corrosion. In the sensor 124, a non-metallic insulating material 138 forms the body of the probe 130 and thus separates the two electrodes 136 from one another. In addition, the probe 130, including the insulating material 138 and the electrodes 136, is coated with an insulating protective layer 140 (such as an epoxy coating, or similar).

Figure 4A:
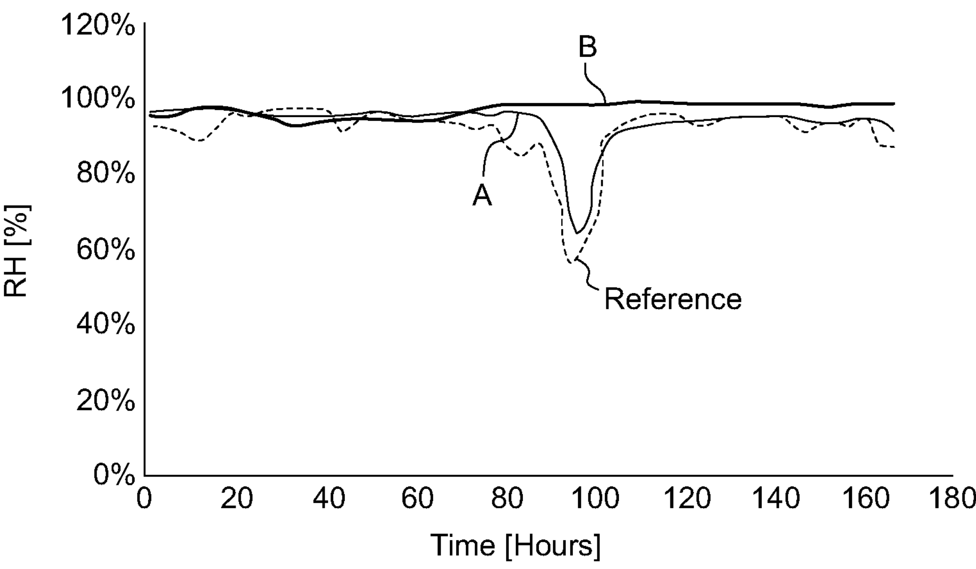
FIGS. 4A to 4C are various plots of relative humidity readings over time, including readings obtained from a reference sensor according to an embodiment of the invention.
Figure 4B:
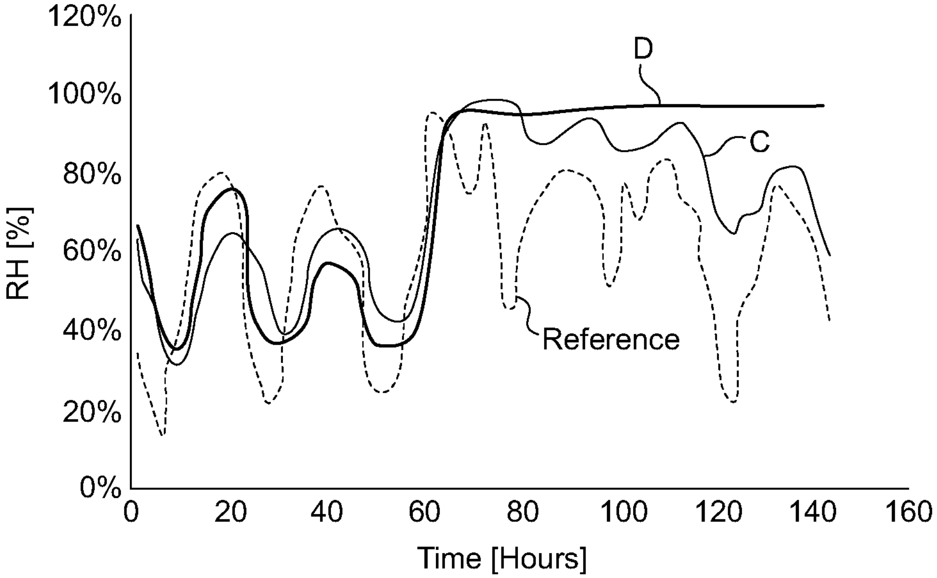
Figure 4C:
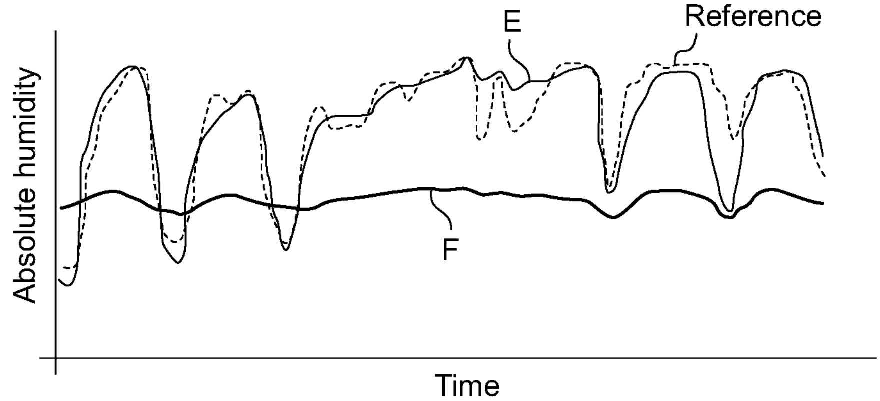

FIGS. 4A, 4B and 4C show various plots which are included to illustrate the importance of the use of a reference sensor (or sensors). In the majority of circumstances, the weatherproof cladding which surrounds a pipe or plant equipment will not be fully airtight; joints in the cladding and the provision of drain holes are just some of the reasons for this. As such, the insulation system cannot be considered to be—or treated as—a closed system. An exchange of humidity between the ambient environment and the interior of the cladding is therefore, to some extent, likely to happen, but this can be accounted for by making use of a reference sensor or sensors.

By determining the degree of correlation between the pipe or equipment sensors and a reference sensor (or sensors), valuable information can be gleaned from the data which is useful in the determination of free water and/or high moisture presence in an insulation system. In general, the inventors have found that a section of insulation which tends to be dry during normal operation of the pipe or equipment changes in line with the ambient environment more so than a typically wet section of insulation. As such, the inventors have identified that sensors from a section of insulation which feedback high humidity readings with a low correlation to the reference (ambient) data provide a strong indication that the section in question is the subject of free water and/or high moisture in the insulation system. This indicates a higher CUI risk.

FIG. 4A shows relative humidity readings over a period of time for sensor A, sensor B and a reference (ambient) sensor. The readings from sensor A and the reference sensor are closely correlated. In contrast, the readings obtained from sensor B do not follow the ambient conditions as closely. Without any prior knowledge of the insulation dryness, the plot of FIG. 4A provides a strong indication that sensor A is located in a typically dry area of insulation and that sensor B is located in an area of the insulation system which is subject to free flowing water and/or high humidity.

FIG. 4B shows relative humidity readings over a period of time for sensor C, sensor D and a reference (ambient) sensor. Sensors C and D correlate fairly closely with the reference sensor until around day 60, when the humidity reading obtained by all 3 sensors increase. This is due to the occurrence of heavy rainfall. Sensor C appears to recover and begin following the reference sensor readings shortly after the rainfall, indicating that the insulating environment in which the sensor is located is drying out. However, the humidity readings of sensor D remain high for a long period of time. This data can therefore be used to pinpoint water ingress points using information relating to the position of the sensors and the pipe topology/geometry.

An alternative use for reference sensor data is to evaluate the extent to which an insulation system is airtight. Although not common or easily achieved, in some systems the goal is to achieve a fully airtight system to prevent the ingress of external humidity, moisture and any free running water into the insulating environment. To achieve an airtight system, the weatherproof cladding must be carefully reviewed to ensure that all seals, joints, holes and gaps are adequately closed.

FIG. 4C shows relative humidity readings over a period of time for sensor E, sensor F and a reference (ambient) sensor. It can be seen that there is a high degree of correlation between the readings of sensor E and the reference sensor. However, the readings obtained by sensor F do not seem to be linked to the ambient readings from the reference sensor. An airtight insulating system should not be affected by ambient conditions. As such, the data from the plot indicated that sensor F is located in a substantially airtight insulating system. It can be seen that sensor F is subject to minor fluctuations and, as such, it is unlikely that it is in a completely airtight system which, in practice, may be difficult to produce. There is high correlation between the readings from sensor E and the reference sensor, which indicates that sensor E is not in an airtight system.

The pipe or equipment sensors can detect sudden changes in humidity: for example, due to a sudden water ingress event. Reference sensors can similarly pick up on sudden changes in humidity: for example, due to sudden heavy rainfall. By correlating the data obtained from the pipe or equipment sensors with the reference sensor data, changes within the insulating environment can be linked to ambient changes or can be identified as being a local phenomenon, occurring only within the insulation system and not linked to the ambient environment.

The readings obtained from reference sensors can also be used to cancel out ambient fluctuations—such as ambient daytime and night-time fluctuations—picked up by the pipe or equipment sensors, which could otherwise obscure important readings or anomalies in the data. Statistical filtering methods, algorithms and machine learning can be employed to carry out this function.

Figure 5A:
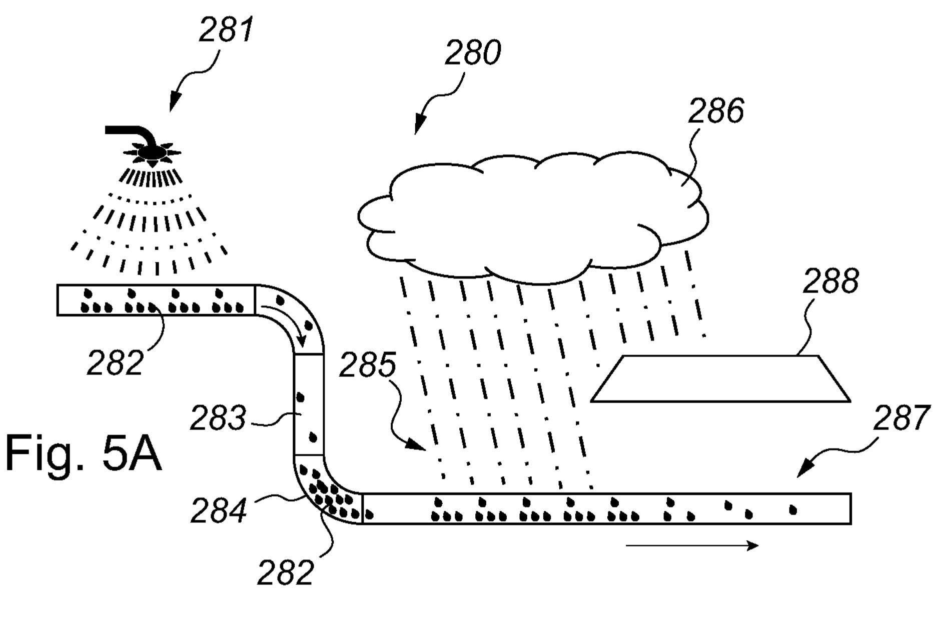
FIGS. 5A to 5C are schematic representations of a pipeline system, a sensor system according to an embodiment of the invention installed on the pipeline system and an optimised insulation design installed on the pipeline system, respectively.

FIG. 5A—which shows, schematically, an insulated pipeline system 280 (although details of the insulation have been omitted for clarity)—provides an example of how the layout of a facility can have an impact on the presence of water in an insulating environment. The left-hand side of the pipeline is disposed horizontally and is positioned directly beneath a deluge sprinkler system 281. The deluge system is routinely operated, leading to direct ingress of water 282 in the insulating environment in this section of pipeline. The water propagates through the insulating environment—either in the void between the cladding and the insulation, the void between the insulation and the pipe, or in the insulation itself—until it reaches a vertically oriented section of pipeline 283. Here, due to the influence of gravity on the water, it begins to accumulate at a lower bend 784 in the pipeline positioned at the base of the vertically oriented section 283. In vertically oriented, or substantially vertically oriented sections such as this, water tends to gather and reside in the base of these sections for this reason.

A horizontal section of pipeline which is open to the environment 285 follows the vertical section 283. Due to its exposure to the outside environment, direct water ingress in the insulating environment also occurs in this section of pipeline. This is followed by a covered section of pipeline 287 which lies underneath the roof 288. As such, this section of pipeline is protected from the external environment and the possibility of direct ingress. However, water is still present in this section as a result of propagation from ingress in the environmentally open section.

Figure 5B:
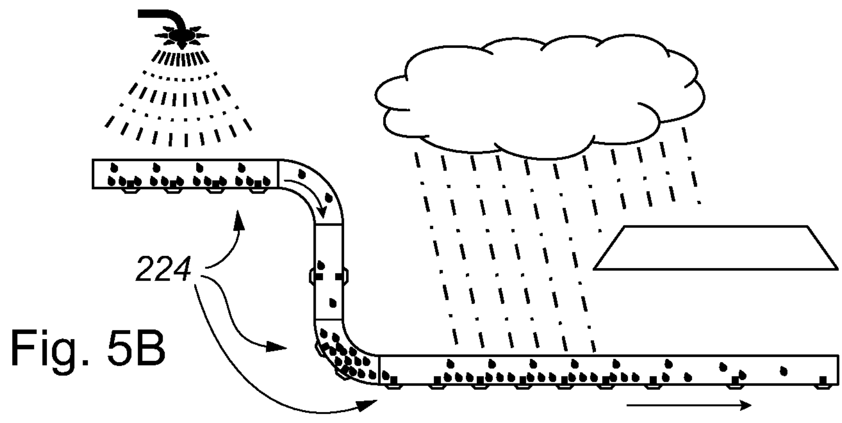

In FIG. 5B, a sensor system in accordance with an embodiment of the invention, is shown generally at 224, is installed on the pipeline system. A higher concentration of sensors is shown as being provided at areas of the pipeline which are expected to be more problematic in terms of water ingress—for example, below the deluge system, at the bottom of the vertical section and at the section open to the environment.

Proportionally high readings from the sensors installed on the sections of pipeline adjacent the deluge system 281 and open to the environment 285 indicate that direct water ingress is occurring at these locations, thus verifying the expectations during the step of sensor placement based on facility layout. Respective decaying patterns in the readings between the deluge system 281 and the area open to the environment 285 (with the exception of the bend 284) and the area open to the environment 285 and the covered area 287 indicate that water present in these areas is a result of propagation.

Figure 5C:
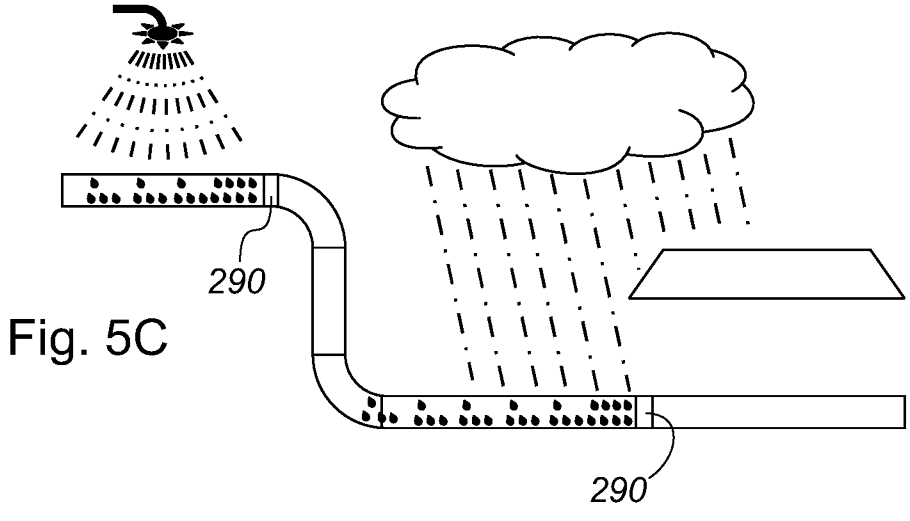

FIG. 5C shows how zonal isolation barriers can be installed in the insulation system in order to block the migration of water from the identified or detected water ingress point or points into otherwise dry areas of the pipeline. The zonal barriers can be pre-fabricated into insulation, or sections of insulation, for installation into the pipeline system, or they can be retrofitted as walls into the pipeline insulation system, and secured using an expanding gasket material. Zonal isolation barriers may be configured to span only the air voids existing between the cladding and the insulation or the insulation and the pipe, or they can extend over the entire area between the pipes outer surface and the outer surface of the insulation, or inner or outer surface of the cladding (where provided).

The sensor system can also be used to measure the impact of an operation on the pipe and, in particular, on the environment for CUI surrounding the pipe. For example, if the pipe is in the vicinity of a deluge testing site—such as that in FIGS. 5A to 5C—the sensor system can be used to determine how long it takes the insulation to dry out, or reach an acceptably dry level, following a deluge test. A similar use would be to determine whether water from the deluge testing site has entered or is entering the insulating environment, during operation, or whether the cladding surrounding the insulation is adequately protecting it from the water.

By combining the readings from multiple sensors in a sensor system an overall picture and/or a model of the insulating environment of an entire system can be built up. This information can be used to establish information regarding the system, and in particular regarding flaws in the insulation system leading to the presence of water in the insulating environment. From analysing the readings obtained from a sensor system, it can be determined whether the presence of water is a result of direct water ingress, and where this occurs, or whether it is a result of propagation of water from one or more distant ingress points.

Information obtained from the system can therefore be used to optimise the design of insulation and to mitigate the occurrence of CUI, as the optimisation of insulation design can be based on various factors such as the location of water ingress points. CUI risk and the general configuration of the facility. Optimisation of insulation design covers all aspects of the insulation arrangement such as selection of the type of insulation, material from which the insulation is formed, number of layers in the insulation arrangement, whether to insulate a specific area or to leave it exposed and where to locate of drainage points (if any) in the system. To reduce the overall risk of corrosion, zonal barriers can be installed which isolate sections of pipe or equipment insulation from one another. The zonal barriers are configured to stop the transport of water and humidity in the insulation and/or in the void or voids between the outer surface of the pipe and the inner surface of the insulation.

Figure 6A:
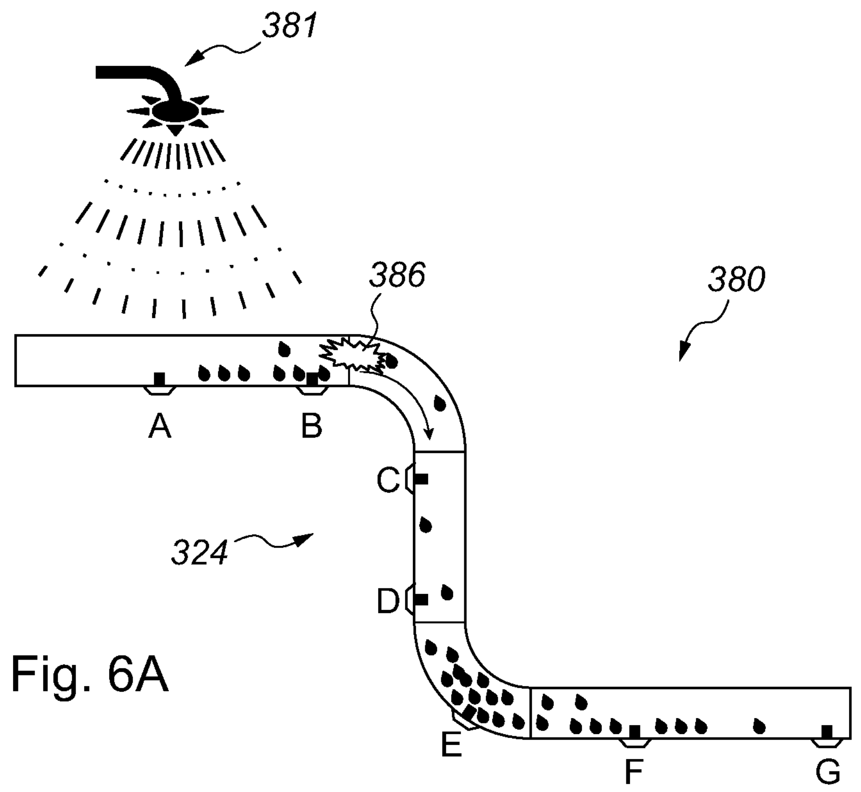
FIG. 6A is a schematic representation of a sensor system according to an embodiment of the invention installed on the pipeline system.
Figure 6B:
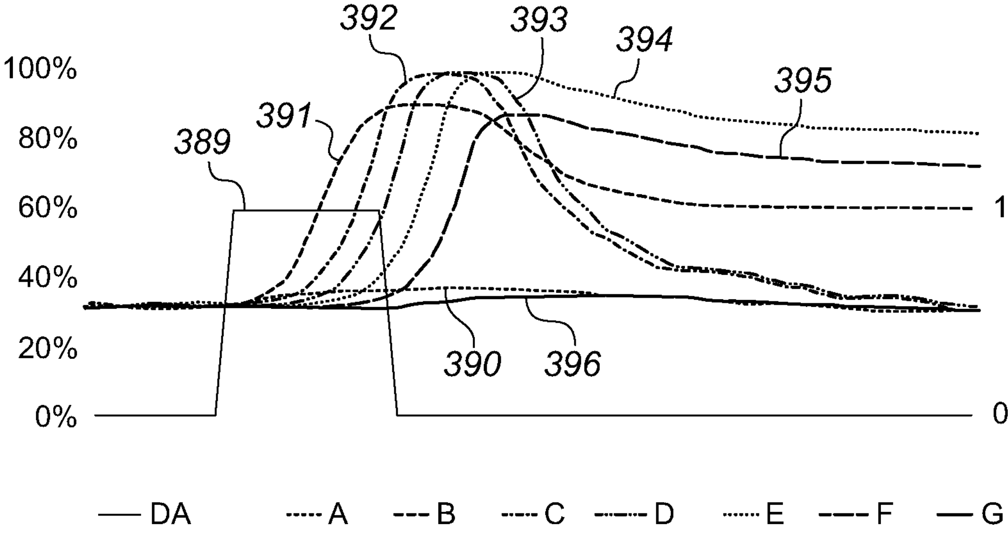
FIG. 6B is a plot of the readings obtained from the sensor system of FIG. 6A over a period of time.

FIGS. 6A and 6B provide an example of how the readings obtained by a sensor system according to an embodiment of the invention installed in a pipeline system subject to the presence of water in the insulating environment may look, and how these readings may be interpreted. The system shown schematically at 380 in FIG. 6A is an insulated pipeline system, like the system 280 in FIGS. 5A to 5C. The system 380 differs from the system 280 as it does not comprise a section which is open to the environment.

The left-hand side of the pipeline system 380 is positioned directly beneath a routinely operated deluge sprinkler system 381. Near the deluge system 381 the pipeline system has a flaw 386 in the exterior cladding surrounding the insulation, through which water is able to enter the insulating environment when the deluge system 381 is operated. As such, the flaw 386 acts as an ingress point for water. This fault may be unknown in instances where visual inspection has not been carried out, where this section of the pipeline system is located in a difficult to reach and/or see area and/or where the flaw is small, difficult to see and/or obscured. A sensor system 324 comprising seven sensors labelled A to G is installed on the pipeline system.

FIG. 6B is a plot of the relative humidity readings obtained from each of the sensors A to G of the sensor system 324, over time. The X-axis represents time and the Y-axis represents relative humidity in percentage (%). The line 389 labelled DA indicates the deluge active status, with the deluge system being in-active when DA is at zero.

Sensor A is installed on the left-hand side of the flaw 386 and its readings over time 390 are relatively unaffected by the activity of the deluge system. Sensor B is very close to the flaw 386. From the plot it can be seen that the readings 391 obtained from Sensor B experience a significant and rapid rise during the deluge activity, and a relatively slow decline thereafter. Sensors C and D are located in a vertical segment 383 of the pipeline system. Like sensor B, sensors C and D also experience a significant and rapid rise; however, the readings obtained from sensors C and D—392 and 393 respectively—also experience a rapid decline as water passes them by, under the influence of gravity. Sensor E is located at a lower bend in the pipeline at the base of the vertically oriented section, where water tends to accumulate for a longer period. This is evident from the relative humidity readings 394 obtained from sensor E which remain the highest throughout the period of time shown by the plot. Like sensor E, sensor F is in a section which is subject to water accumulation. However, water in this area is moving and the readings 395 from sensor F show that the area in which it is located does not experience as high a relative humidity as sensor E. The readings 396 from sensor G show that relative humidity begins to taper off as the pipeline system continues horizontally, allowing water to disperse.

By reviewing the outputs from the sensor system, such as the plot of FIG. 6B which tracks the sensor readings during a cycle of deluge activity, a user can determine whether water is present in the insulating environment and, if so, if an ingress point or points exists. A user can also use the sensor outputs to pinpoint the vicinity in which the ingress point, or points, is located. For example, with reference to FIG. 6B, the notable differences between the readings 390 and 391 obtained from neighbouring sensors A and B and may be interpreted to determine that an ingress point is located near to sensor B or sensor C. If facility layout and orientation of the pipeline system is known, the user could attribute the high readings 392, 393 and 394 obtained from sensors C, D and E to the nature of their orientation. This analysis would guide a user (such as a facility manager) in optimisation of the insulation design. Optimisation of insulation design might in this case include repair of the flaw in the cladding, installation of a zonal barrier to stop propagation of water in the insulating environment and/or installation of a drainage point-perhaps at the lower bend proximate sensor E, where accumulated water can be drained under the influence of gravity. The outputs from the sensor system along with information relating to the layout of the facility can also be analysed to determine whether certain locations are wet due to a result of direct water ingress (i.e. in the location of sensor B), or due to propagation of water in the insulating environment (i.e. in the location of sensor G).

Figure 7:
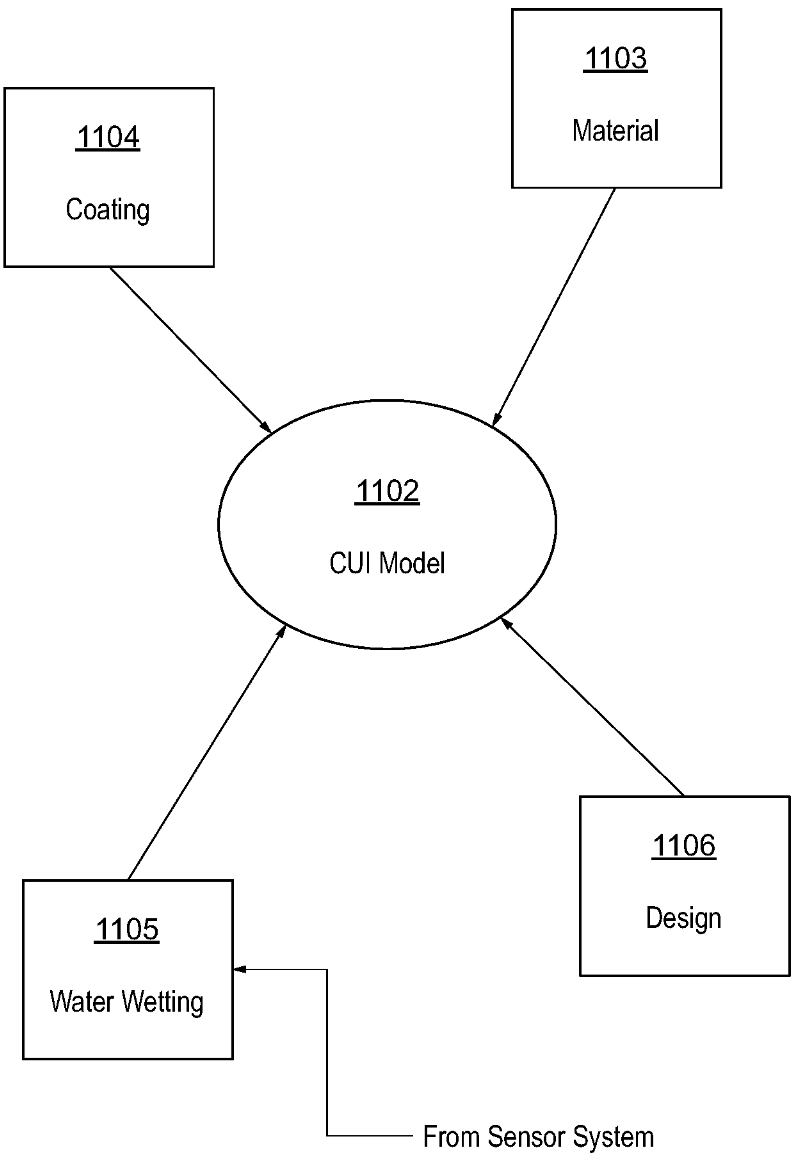
FIG. 7 is a schematic representation of a method of evaluating the likelihood of the occurrence and/or presence of CUI for an insulated metal structure according to an embodiment of the invention.

FIG. 7 is a flow chart providing an example of how data obtained from the system can be used, along with other inputs, in evaluating the likelihood of the occurrence and/or presence of corrosion under an insulating material surrounding a metal structure. In this example, various inputs are fed into a model 1102 to determine the probability of failure of a pipe or equipment due to CUI. The probability of failure 1102 is a function of four main factors: material 1103, coating 1104, water wetting 1105 and design 1106.

The material 1103 factor input concerns the material from which the pipe or equipment is formed and may also include information relating to the material surface or surrounding temperature and temperature fluctuations. The coating 1104 input might include information such as: the material from which the coating is formed; the age of the coating; and the temperature of the coating. For the water wetting input 1105, information relating to the insulating system and maintenance schedules may be used, including, for example, the watertightness of the insulating system, the water held by the insulating system and any drainage and evaporation effects. Design considerations such as pipe wall thicknesses and diameters and non-destructive testing (NDT) results may be used in the design input 1105. Following consideration of each of the input factors 1102, 1103, 1104 and 1105, each factor is risk assessed and assigned an associated probability of failure score ranging from very low to very high. The overall probability of failure 1102 is a function of these scores.

The probability of failure 1102 is generally a static value for the pipe, pipe section or piece of equipment in question. However, by replacing one or more of the inputs 1103, 1104, 1105, 1106 with a dynamic input, a dynamic representation of the probability of failure 1102 can be generated. The continuous, real-time outputs of a sensor system of the present invention can be used to provide the relevant water wetting 1105 information required by the function and thus, provide a dynamic input to the function.

For example, the sensor system could identify insulating environments surrounding pipes or pipe sections which are substantially dry and which therefore have a low or very low score. These sections could be omitted from a maintenance scope as CUI at these sections will be unlikely. The system can update the probability of failure 1102 function on the identification of wet areas, ingress points, free water flowing areas and the like.

Information obtained from the sensor system could also be linked to and provide an insight into the coating factor 1104 and its degradation.

Corrosion can generally be considered to be a function of multiple variables including (amongst other factors) time of exposure to water, temperature, presence of water and/or humidity and material properties. Corrosion models and predictions can be generated on the basis of this data. Without the use of a sensor system such as that according to embodiment of the invention, key variables of the corrosion function are unknown and resulting corrosion models and predictions are of limited value.

In many facilities it is known to implement a Risk Based Inspection (RBI) scheme, where manual inspection intervals for a pipe, structure or plant equipment are based on a risk assessment which considers the likelihood of failure due to corrosion versus the impact of failure due to corrosion. A pipe or plant equipment which has a high risk score in the risk assessment is typically inspected more often and more thoroughly than a low risk pipe or plant equipment. However, due to the uncertainties associated with RBI, those producing maintenance inspection programmes must be conservative when determining the inspection scope and intervals; this consequently drives up the cost of inspection planning and execution.

Monitoring the presence of water and/or temperature in an insulating environment allows for the introduction of a Data Based Inspection (DBI) scheme. DBI schemes can be used to supplement RBI schemes. In some cases, DBI schemes based on a matured corrosion model may provide corrosion estimates—for example, quantification of metal loss due to corrosion—based on data obtained from a sensor monitoring system which are considered to be accurate enough to replace RBI schemes altogether.

One method of improving and maturing a data based corrosion model is to collect inspection data—including measurements and observations—to document actual/real corrosion over a period of time and correlate this with the monitored data obtained from the sensor system during the same period of time. This building and maturing method can go through an iterative process, or learning cycle, to increase the reliability and accuracy of the corrosion model over time. Such an iterative process is well suited to be supported by Artificial Intelligence (AI) and Machine Learning (ML) algorithms.

Figure 8A:
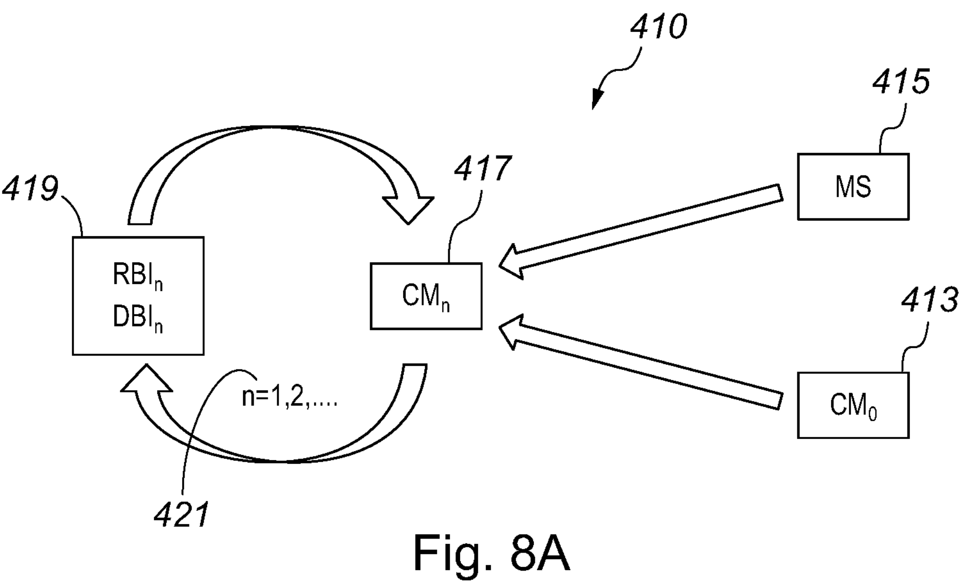
FIG. 8A is a flow diagram of a learning cycle according to an aspect of the invention.

FIG. 8A is a visual indication of a learning cycle 410 which can be used to improve and mature a corrosion model. The initial corrosion model (CMn) 417 is based on data obtained from the monitoring system (MS) 415—which includes humidity, free water and/or temperature readings from the sensor system according to embodiments of the invention as well as any relevant reference data, for example from ambient sensors—and theoretical data (CM0) 413 based on literature and theoretical foundations. The theoretical data might include data obtained from calculations relating to the insulating environments and/or the geometry or topology of the pipe work or plant equipment which it surrounds.

Figure 8B:
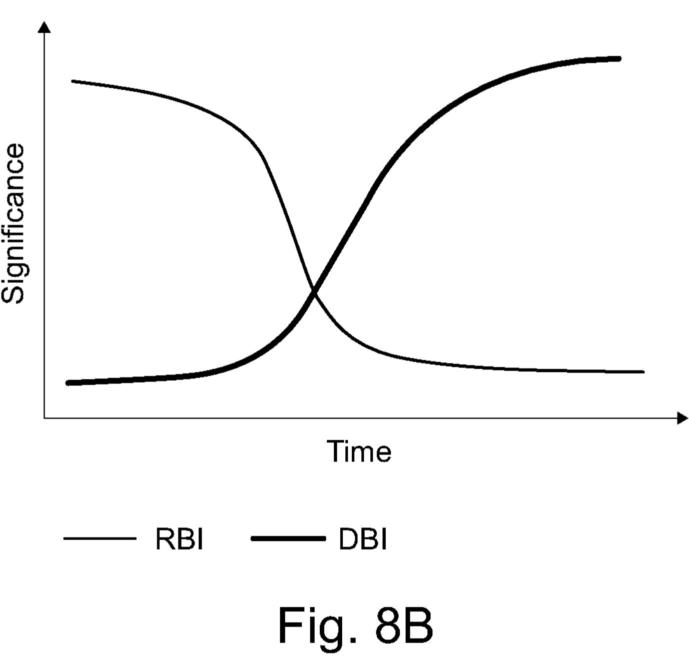
FIG. 8B is a plot showing the relative significance of risk based inspection and data based inspection over time.

This data might also include information, data and/or values obtained from literature. The corrosion model is matured through iterative steps (n=1, 2, 3 . . . ) of corrosion estimation and prediction, by correlating inspection data against the monitored data 415 and theoretical foundations. Risk based inspection (RBIn) and data-based inspection (DBIn) 419 are therefore repeatedly carried out and compared to establish a stronger, more reliable and accurate corrosion model. FIG. 8B shows how, with assurance from inspection data and through the course of iteratively maturing a corrosion model, data-based inspection can become a more significant part of maintenance programme planning that risk based inspection, over time.

As the accuracy and reliability of the data-based corrosion model is increased throughout this iterative process, inspection and maintenance schedules can become more efficient and targeted. This is achieved by focusing inspection and maintenance resources on pipes, equipment and structures for which specific maintenance needs have been identified and confirmed, rather than depending on a purely theoretical process for identifying these needs.

Figure 9:
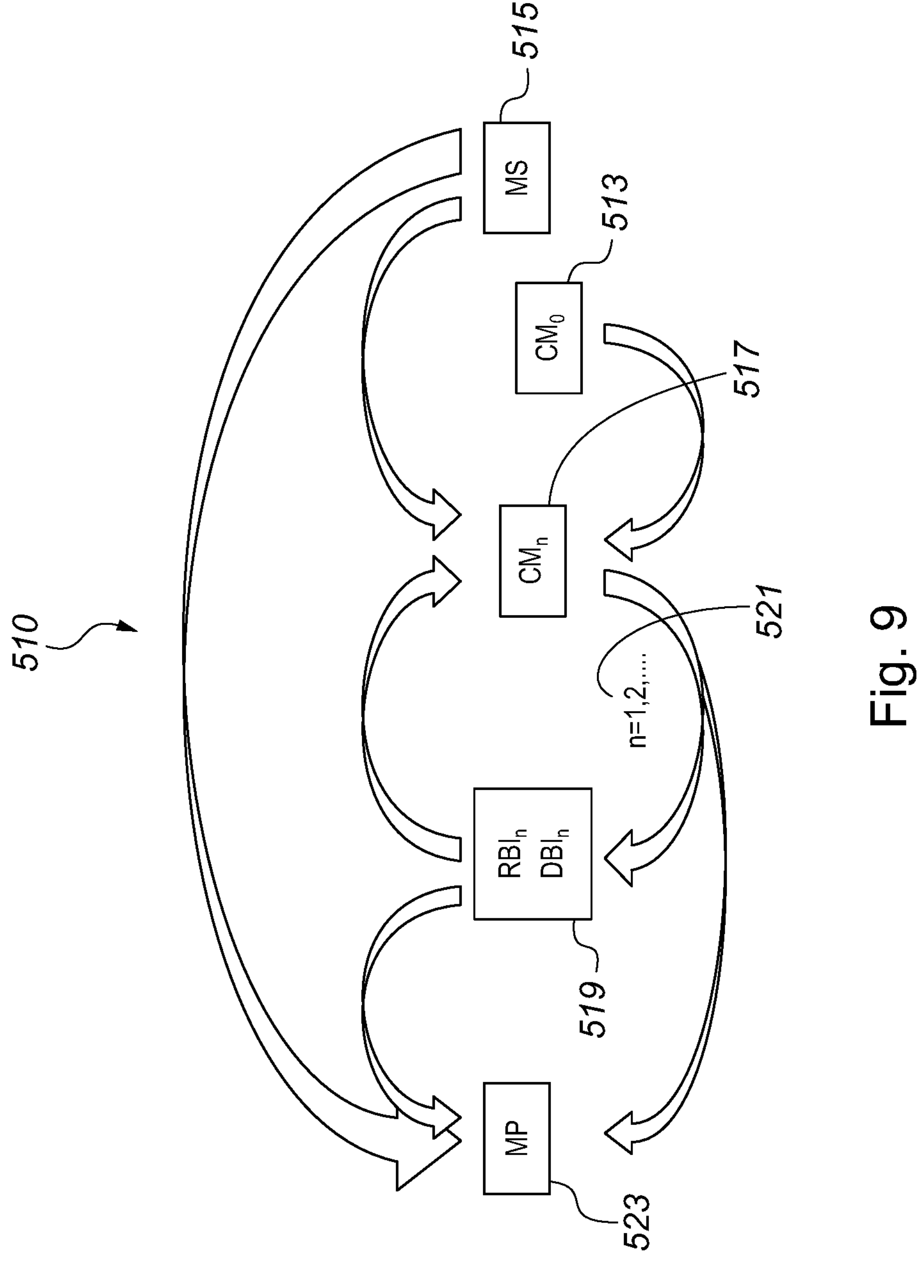
FIG. 9 is a flow diagram of a learning cycle according to an aspect of the invention.

FIG. 9 is a visual indication of a learning cycle 510 which is similar to the learning cycle shown in FIG. 8A, with like components indicated by like reference numerals, incremented by 100. The learning cycle 510 shows that the corrosion model data (CMn) 517, matured through the iterative steps described with reference to FIG. 8A, and the data obtained from the monitoring system (MS) 515 is used to generate and fine tune a maintenance programme (MP) 523.

The monitored data obtained from the sensor system, either alone or together with the corrosion model, can also be used to identify design weaknesses and provide valuable inputs to the maintenance program.

Corrosion occurs on the outer surface of a pipe or piece of equipment. Humidity readings obtained within an outer portion of a layer of insulation surrounding said pipe or equipment provide an indication, but not a precise measurement, of the environment at the surface of that pipe or equipment. There is a benefit to obtaining such readings (i.e. those from an outer portion of the insulation) as this is the location closest to where water ingress typically begins. However, to provide a fuller picture of the environment for CUI, it is desirable to obtain readings from multiple depth locations within an insulating material. Where the insulating material encases a substantially circular or tubular part—such as a pipe—the multiple depth locations correspond to radial locations in the insulating material, and a radial profile of measurements can be produced. Otherwise, the depth readings generally correspond to the thickness of an insulating material in a direction between the insulated surface and the outer surface of the insulating material (or materials).

Figure 10:
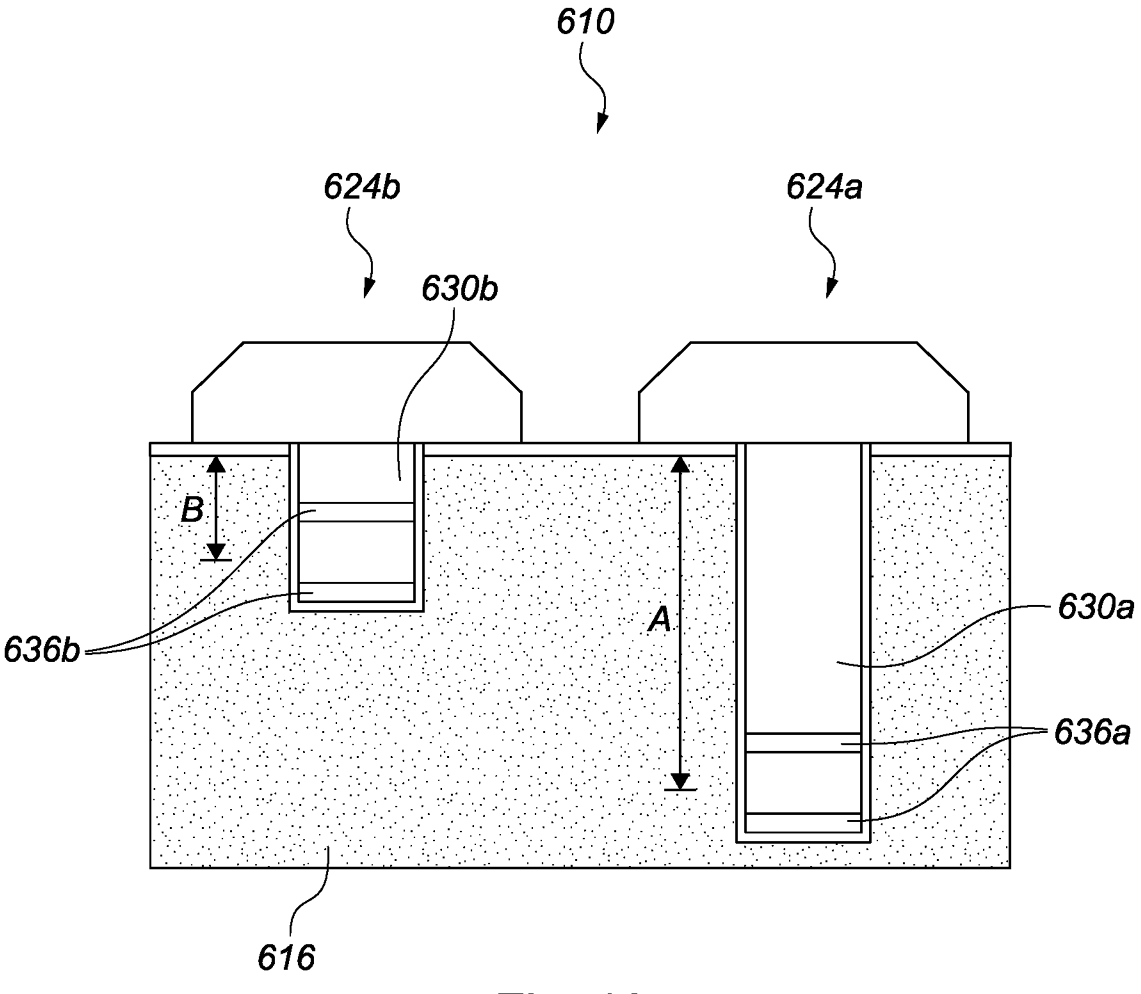
FIG. 10 is a schematic representation of a sensor system according to an embodiment of the invention.

FIG. 10 shows, generally at 610, a sensor system for obtaining measurements at different depth (or radial) positions in an insulating material 616. The sensors are shown as free water sensors for simplicity; however, the sensors in this system are interchangeable with a sensor employing combined humidity and free water sensor technology, such as that described with reference to FIGS. 2A and 2B.

The system comprises two sensors 624 *a* and 624 *b* installed adjacent to one another in an insulating material 616. The first sensor 624 *a* has a longer probe 630 *a* than the probe 630 *b* of the second sensor 624 *b*. As such, the electrode pair 636 *a* of the first sensor 624 *a* is positioned at an approximate depth of A in the insulating material 616 and the electrode pair 636 *b* of the second sensor 624 *b* is positioned at an approximate depth of B.

As described above with reference to FIG. 1, the associated processing means knows the location of each of the sensors 624 *a*, 624 *b*. The processing means also knows the length of each sensor probe and thus the depth of the reading obtained by each sensor. This data is relayed to the processing means either by way of manual input or wireless data transmission. Where the overall depth of the insulating material is known, the processing means can determine the proximity of each reading to the surface of the pipe or equipment: information from which a 3D model of the system can be constructed. The system can be programmed to group the location of adjacent sensors having differing probe lengths together, such that the readings obtained by these sensors give various depth readings at one approximate location on/in the insulating material.

Figure 11A:
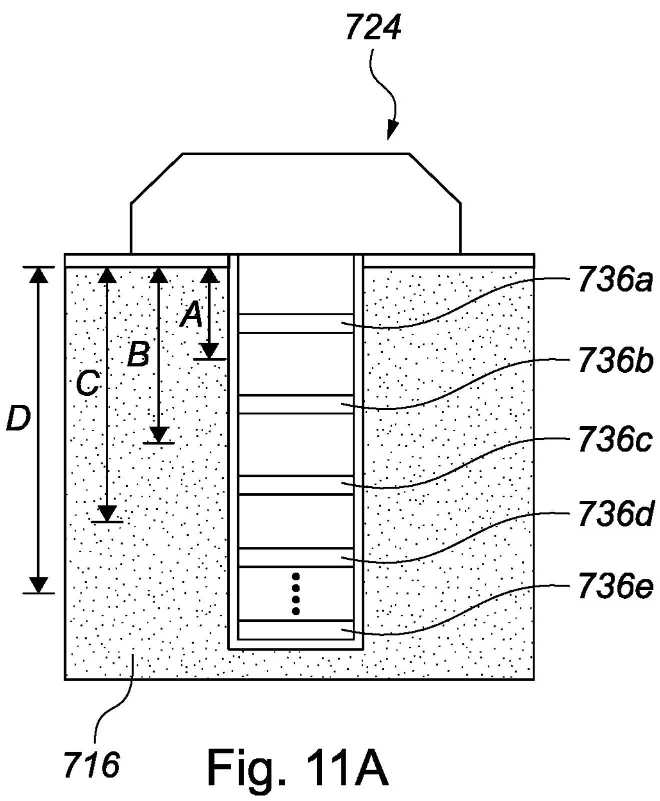
FIG. 11A is a schematic representation of a sensor according to an embodiment of the invention.

In an alternative embodiment of the invention, a single sensor can be used to obtain readings at different depth (or radial) positions in an insulating material. FIG. 11A shows such a senor 724. The sensor 724 is shown as a free water sensor for simplicity; however, the sensor in this system is interchangeable with a sensor using combined humidity and free water technology, such as the sensor described with reference to FIGS. 3A and 38. The sensor 724 functions in substantially the same way as the sensors of FIGS. 3A, 3B and 10. However, the sensor 724 differs from those sensors in that it is equipped with numerous electrodes 736 *a*, 736 *b*, 736 *c*, 736 *d* . . . 736 *n*.

Pairs can be formed between adjacent electrodes 736 *a-n*, and the capacitance value between each pair of electrodes can be measured to obtain a water reading at various depth (or radial) positions. A reading obtained from the electrode pair 736 *a* and 736 *b* will correspond to an approximate depth of A in the insulation, a reading obtained from the electrode pair 736 *b* and 736 *c* will correspond to an approximate depth of B in the insulation, and so on. The processing means is told, by manual input or wireless communication protocol, the location of each electrode pair on the probe and, as such, can compute the corresponding insulation depth (or radial) position and/or proximity to the outer surface of the pipe/equipment.

In alternative combined humidity and free water embodiments of the invention, the electrode pairs, and/or additional sensing elements provided on the probe (such as additional or alternatively provided sensor chips), are also capable of detecting changes in humidity. In such embodiments, a humidity sensor chip in the external body part of the sensor may not be provided.

Figure 11B:
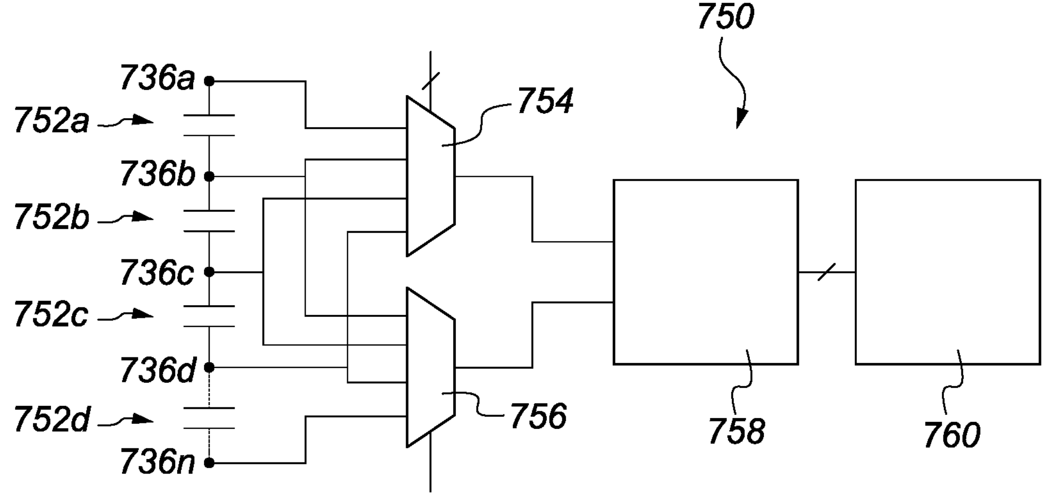
FIG. 11B is a simplified circuit block diagram of the sensor of FIG. 11A.

FIG. 11B is a simplified circuit block diagram which shows in more detail how the sensor of FIG. 11A functions. The circuit, shown generally at 750, comprises four capacitors 752 *a*, 752 *a*, 752 *c* and 752 *b* formed by the electrode pairs connected to shared electronics by analogue multiplexors 754 and 756. Channel multiplexing allows the shared electronics to perform capacitance measurements from individual channels in a sequence. The analogue and/or digital circuitry which measures the capacitance value(s) is shown at 758.

A microprocessor 760 is provided for multiplexer control, the processing of capacitance values and conversion to humidity values.

The foregoing embodiment concerns a sensor which capable of taking readings at different depth (or radial) positions in an insulating material. It will be appreciated that in embodiments of the invention, this type of sensor can be used to provide a reference (or ambient) reading in the same manner as the sensor 9 in the system of FIG. 1, in addition to one or more readings relating to humidity in the insulating material. The reference reading and the one or more readings relating to humidity in the insulating material can be correlated in the same manner as those described above.

In this embodiment, the outermost electrode pair is more sensitive to the ambient environment and therefore operable as the reference sensor. The other electrode pairs are embedded at a greater depth within the insulating material and therefore function as ordinary sensors, to obtain humidity readings indicative of water inside the insulating material.

In some embodiments, the innermost electrode pair (i.e. the pair closest to the surface of the pipe or plant equipment) may be selected to be the reference sensor, where the environment immediately adjacent the pipe or plant equipment surface is of interest.

Where more than one of this type of sensor is provided in a sensor system, an electrode pair of only one of the sensors may function as the reference sensor or, alternatively, an electrode pair of some or all of the sensors may function as a plurality of reference sensors.

In the foregoing description, the sensors are described as being self-installed into or on the cladding or insulation, without the use of an external mounting means. However, the sensors described can also be used with a mounting apparatus. FIGS. 12A to 12D show an example of such a sensor mounting apparatus 870.

Figure 12A:
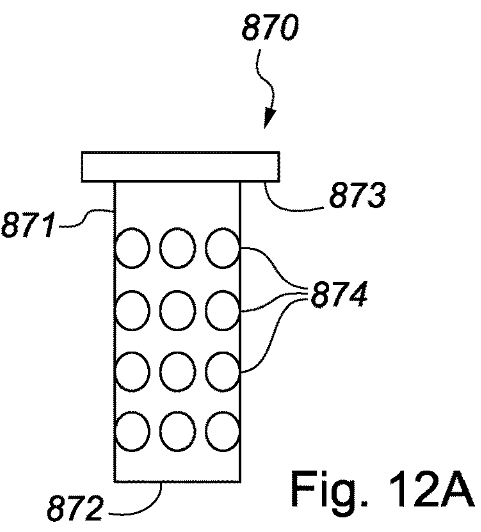
FIGS. 12A to 12D are a series of schematic representations of the installation of a mounting apparatus according to an embodiment of the invention.

The mounting apparatus 870, shown in FIG. 12A, comprises a hollow cylindrical body 871 with a closed end at its base 872. The apparatus 870 has an upper lip which defines a shoulder 873, configured to engage an outer surface of cladding or insulation upon installation into an insulating material. The apparatus 870 also comprises a series of apertures 874, which function to expose the sensor (when inserted) to the insulating material. The apertures 874 can be specifically arranged and/or grouped to correspond to the locations at which various readings are taken at differing depths on a sensor, as described below.

Figure 12B:
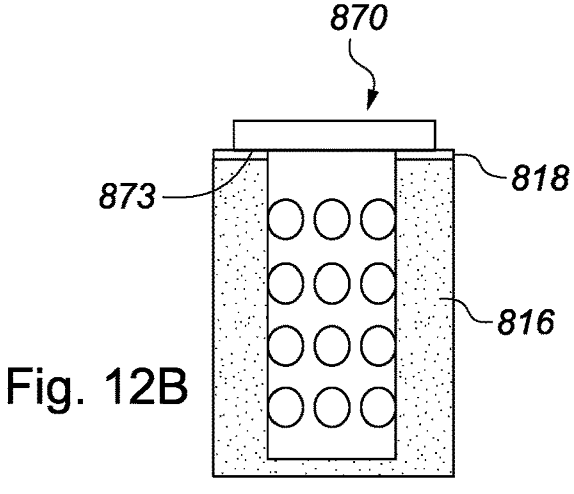

Mounting apparatus 870 of this type can be pre-manufactured into a protective cladding or casing 818, and the sensors 824 can be installed subsequently into the mounting apparatus. Alternatively, the mounting apparats 870 can be retrofitted into an existing insulating arrangement. FIG. 12B shows the mounting apparatus 870 installed in a layer of insulation 816, with the shoulder 873 abutting the cladding 818. The mounting apparatus 870 is retained in the insulating mater 816 and/or cladding 818 by any suitable means. For example, a mere mechanical interference fit may hold the apparatus 870 in place, or its outer cylindrical surface might be provided with an external self-tapping screw thread for engagement with the cladding 818 and/or insulating material 816. In some embodiments, the shoulder 873 is adhered to the outer surface of the cladding or insulation, where the cladding is absent. Magnetic attraction could also be used to retain the mounting apparatus 870 in place.

Figure 12C:
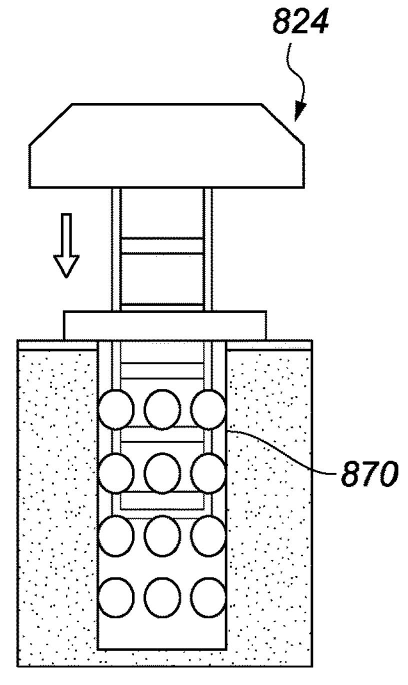

FIG. 12C shows a sensor 824 as it is being inserted into the mounting apparatus 870, in the direction of the arrow. The sensor 824 can be screwed into the mounting apparatus 870, or otherwise retained within the apparatus in any of the ways described above with reference to the retention of the apparatus in the insulating material 816 and cladding 818 assembly.

Figure 12D:
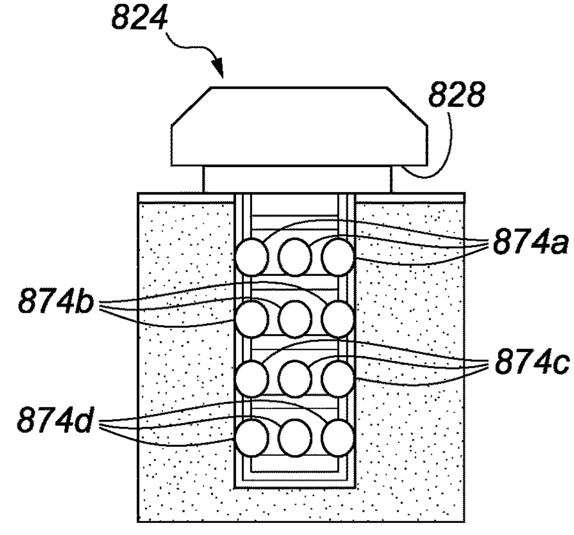
Figure 12D:

FIG. 12D shows the sensor 824 and mounting apparatus 870 following installation. The sensor 824 is a sensor having multiple pairs of electrodes, capable of taking measurements at different depth (or radial) positions in the insulating material. Here, it can be seen that discrete groups of apertures in the mounting apparatus are arranged to correspond to each electrode pair. The uppermost group 874 *a* corresponds to the uppermost electrode pair and thus the shallowest depth (or radial) measurement obtained by the sensor. The groups of apertures 874 *b*, 874 *c* and 874 *d* similarly correspond to electrode pairs on the sensor and thus different depth (or radial) measurements obtained by the apparatus.

In some arrangements, several types of insulating layers—such as sheets or blankets—are used to protect pipes or equipment. The sensors described with reference to FIGS. 3A, 3B, 10 and 11A can be used to take measurements within these different layers. Single layer measurements can also be taken using a single measurement sensor, such as the sensor described in FIGS. 3A and 38. However, in each case, it is typically undesirable to puncture these layers of insulation as their purpose includes blocking water ingress and migration. Perforating the layers can therefore generate new leakage points.

Therefore, whilst it is desirable to obtain readings from throughout several insulating layers or to generally puncture one or more layers to obtain single or multiple readings, it is also desirable to seal any resultant holes in the insulation to avoid water seeping between these layers.

Figure 13:
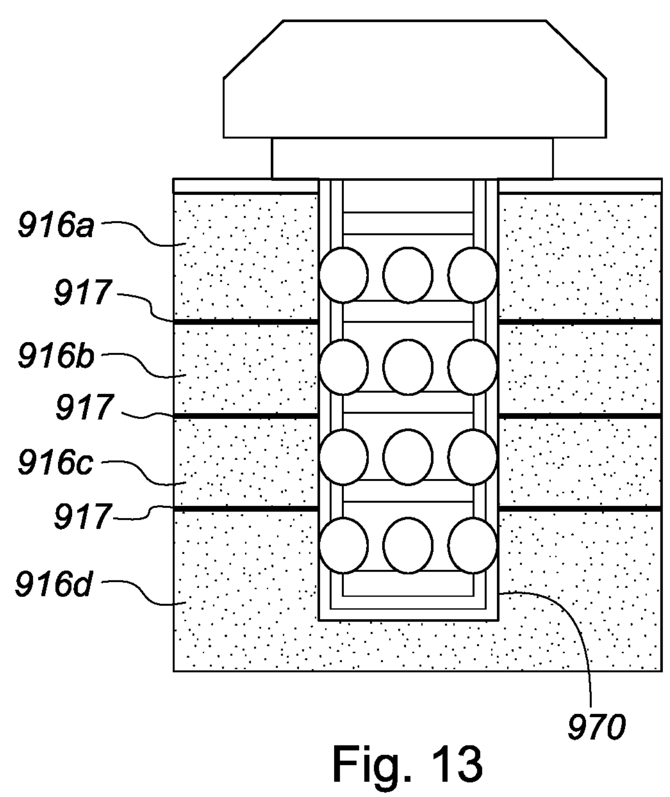
FIG. 13 is a schematic representation of a sealing method according to an embodiment of the invention.

The mounting apparatus described with reference to FIGS. 12A to 12D is one effective way in which the holes in layered insulating materials can be sealed. The holes made in the insulating materials for the mounting apparatus can be slightly smaller than the outer diameter of the mounting apparatus itself such that once the mounting apparatus is installed, the mechanical interference fit between it and the layers of insulating material adequately seals these holes. In addition, O rings or other suitable sealing material(s) can be provided on the whole or part of the outer surface of the mounting apparatus to improve the seal. A mounting apparatus 970, inserted into a multi-layer insulation system comprising insulating layers 916 *a*, 916 *b* and 916 *b*, is shown in FIG. 13. The apparatus 970 is arranged such that solid sections of its cylindrical outer surface (i.e. those sections which do not have apertures formed therein) are aligned with the spaces 917 and/or membranes between each layer of insulation, to avoid seepage or leakage between layers.

Figure 14:
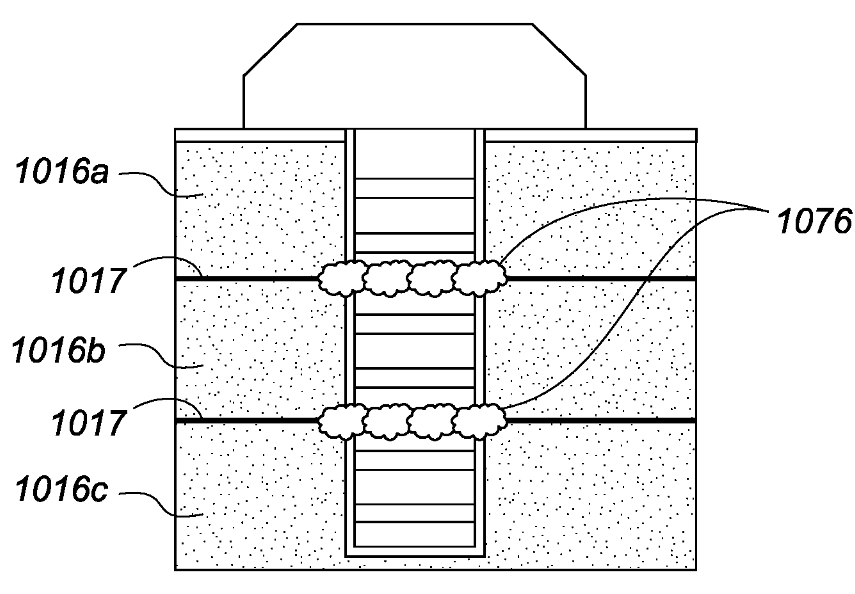
FIG. 14 is a schematic representation of a sealing method according to an embodiment of the invention.

FIG. 14 shows a different way of sealing holes produced between insulating layers. In this embodiment, a sensor mounting apparatus is not present; however, it will be appreciated that the techniques described are suitable for use with a sensor mounting apparatus when used. Before inserting the sensor, the layers of insulating material 1016 *a*, 1016 *b*, 1016 *c* are punctured to produce the necessary holes for fitting the sensor. At this point, before installation of the sensor therein, an expanding material 1076 is applied to seal the spaces 1017 and/or membranes between each punctured layer of insulation. Following application of the material 1076, the sensor is inserted and installed as normal.

Several alternative, un-illustrated sealing solutions have been realised by the inventors. For example, prior to installation the sensor probe (or sections thereof) is provided with an airtight cover, surrounding a layer or layers of expandable material. The cover can be removed prior to installation of the sensor to reveal the expandable material, which is triggered to slowly expand upon exposure to air or humidity, or by another factor, thereby beginning a short time window in which to install the sensor before expansion of the material completes. The sensor then seals the holes in the insulating layers following installation of the sensor therein. Another alternative sealing solution is the provision of a compressible material on the sensor probe (or sections thereof), which is initially compressed by a sleeve provided around the sensor probe (for example, a thin metal cylindrical sleeve). Removal of the sleeve prior to installation causes the compressible material to expand. Again, this begins a time window in which to install the sensor, such that it seals the layers of insulating material when installed. In both of these examples, the cover or the sleeve could be dissolvable in place, by air or humidity, following insertion of the sensor.

The invention provides a sensor system for detecting the presence of water in an insulating material surrounding plant equipment and/or pipe work and a method of evaluating a corrosion condition of plant equipment and/or pipe work surrounded by an insulating material. The sensor system comprises a plurality of sensors located in and spatially distributed over the insulating material operable to provide a sensor output indicative of the presence of water in an insulating material. The system further comprises at least one reference sensor operable to provide a reference sensor output indicative of the presence of water in an ambient environment in the vicinity of the plurality of sensors and a processor configured to receive the sensor outputs from the plurality of sensors and the reference sensor output. The processor is configured to correlate the sensor outputs from the plurality of sensors and the reference sensor output to provide a correlation data output for use in evaluating a corrosion condition.

Various modifications to the above-described embodiments may be made within the scope of the invention, and the invention extends to combinations of features other than those expressly claimed herein.

What is claimed is:

1. A sensor for detecting humidity and/or free water, the sensor comprising:

a means for detecting the presence of humidity; and/or
a means for detecting the presence of free water; and
an elongate body,
wherein the sensor is operable to provide a sensor output indicative of the presence of free water and/or humidity,
wherein the elongate body or a section thereof has an external self-tapping means, and wherein the sensor is configured to be self-installed into a cladding and insulation via the external self-tapping means.

2. The sensor according to claim 1, wherein the external self-tapping means comprises an external self-tapping screw thread.

3. The sensor according to claim 1, wherein the sensor is for detecting humidity and/or free water in an insulating material surrounding plant equipment and/or pipe work.

4. A sensor system for detecting the presence of water at a plurality of depth locations within an insulating material, the sensor system comprising:

a first sensing means and a second sensing means;

wherein the first sensing means is operable to provide a first sensor output indicative of the presence of water at a first depth location in the insulating material; and wherein the second sensing means is operable to provide a second sensor output indicative of the presence of water at a second depth location in the insulating material;

wherein the sensor system comprises at least one sensor having an elongate body configured to be inserted into an insulating material;

wherein the first sensing means is located on the elongate body; and wherein the first depth location corresponds to the location of the first sensing means on the elongate body; and wherein the first sensing means and/or second sensing means is a capacitive sensing means, the capacitive sensing means comprising at least two electrodes spaced apart from one another on the elongate body and a means for determining the capacitance value between the at least two electrodes.

5. The sensor system according to claim 4, wherein the sensor output is a reading relating to humidity and/or a reading relating to free water.

6. The sensor system according to claim 4, wherein the system comprises a plurality of sensing means, wherein the plurality of sensing means comprises the first sensing means and the second sensing means and at least one additional sensing means, wherein each sensing means of the plurality of sensing means corresponds corresponding to a respective depth location of the plurality of depth locations.

7. The sensor system according to claim 4, wherein the at least one sensor is capable of detecting the presence of humidity and/or free water in an insulating material.

8. A method of detecting the presence of water at a plurality of depth locations within an insulating material, the method comprising:

providing a sensor system according to claim 4; and obtaining sensor outputs from each of the sensing means, wherein the first depth location and the second depth location are known.

9. The method according to claim 8, further comprising determining, based on the location of each of the sensing means on an elongate body or bodies of the one or more sensors, the depth location of the sensing means in the insulating material.

10. The method according to claim 8, further comprising linking the sensor outputs from each sensing means to the determined location of the sensing means.

11. The method according to claim 8, wherein the outputs obtained from the sensor system are used to construct a profile of water readings throughout the depth of the insulating material.

12. The method according to claim 8, wherein the insulating material is located on or around plant equipment and/or pipe work.

* * * * *